United States Patent
Fergusson

(10) Patent No.: US 7,187,282 B2
(45) Date of Patent: Mar. 6, 2007

(54) DIGITAL CAPACITIVE SENSING DEVICE FOR SECURITY AND SAFETY APPLICATIONS

(75) Inventor: Robert T. Fergusson, Palm Harbor, FL (US)

(73) Assignee: Invisa, Inc, Sarasota, FL (US)

( * ) Notice: Subject to any disclaimer, the term of this patent is extended or adjusted under 35 U.S.C. 154(b) by 0 days.

(21) Appl. No.: 11/222,339

(22) Filed: Sep. 8, 2005

(65) Prior Publication Data

US 2006/0055534 A1    Mar. 16, 2006

Related U.S. Application Data

(60) Provisional application No. 60/608,298, filed on Sep. 9, 2004.

(51) Int. Cl.
*G08B 13/18* (2006.01)

(52) U.S. Cl. .......... 340/567; 340/562; 340/825.71; 340/541

(58) Field of Classification Search .......... 340/657, 340/521, 562, 541, 825.71, 933, 500, 565, 340/551, 517, 522, 552, 556; 318/466, 467; 454/75, 69; 455/130, 150.1; 49/26

See application file for complete search history.

(56) References Cited

U.S. PATENT DOCUMENTS

| | | | | | |
|---|---|---|---|---|---|
| 4,169,260 | A | * | 9/1979 | Bayer | 340/562 |
| 4,464,651 | A | * | 8/1984 | Duhame | 340/521 |
| 4,843,639 | A | * | 6/1989 | Beals | 398/111 |
| 4,996,795 | A | * | 3/1991 | Niswonger | 49/280 |
| 5,337,039 | A | * | 8/1994 | Simon | 340/562 |
| 5,670,886 | A | * | 9/1997 | Wolff et al. | 324/644 |
| 6,046,562 | A | * | 4/2000 | Emil | 318/484 |

* cited by examiner

*Primary Examiner*—Daniel Wu
*Assistant Examiner*—Daniel Previl
(74) *Attorney, Agent, or Firm*—Gifford, Krass, Groh, Sprinkle, Anderson & Citkowski, P.C.

(57) ABSTRACT

A capacitive sensing system senses the presence of an object proximate to an antenna using a sensing field signal having a sensing field frequency. The capacitive sensing system can be used in security systems, to provide an alarm if a valuable object is removed from where it can be detected. The capacitive sensing system can also be used to provide an alarm when an object is detected near a moving member, such as a parking barrier gate, sliding gate, elevator door, garage door, or window. The sensitivity of the system may be adjustable according to one or more conditions, such as position of the moving member, time of day, or operator inputs (for example, to put the system into a maintenance mode having low sensitivity). Systems may also have a cut-out, in which alarms are suppressed.

37 Claims, 19 Drawing Sheets

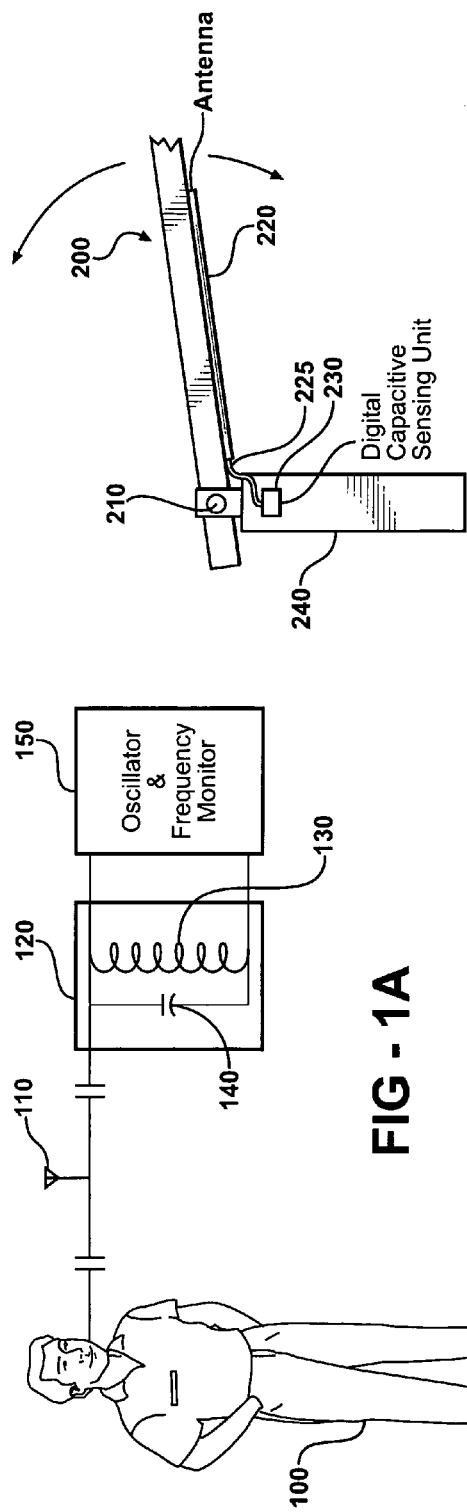
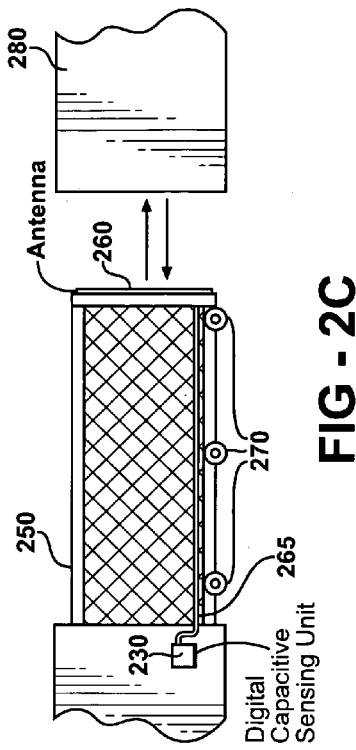
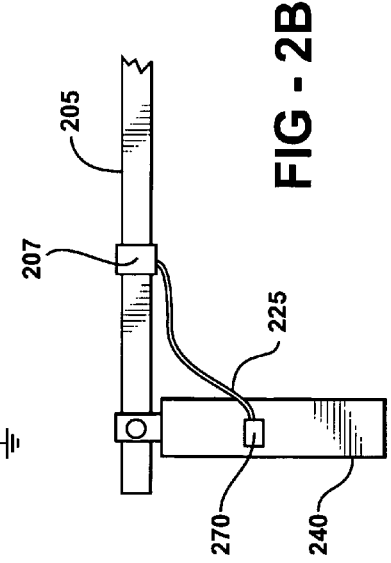
FIG - 1A
FIG - 2A
FIG - 2B
FIG - 2C

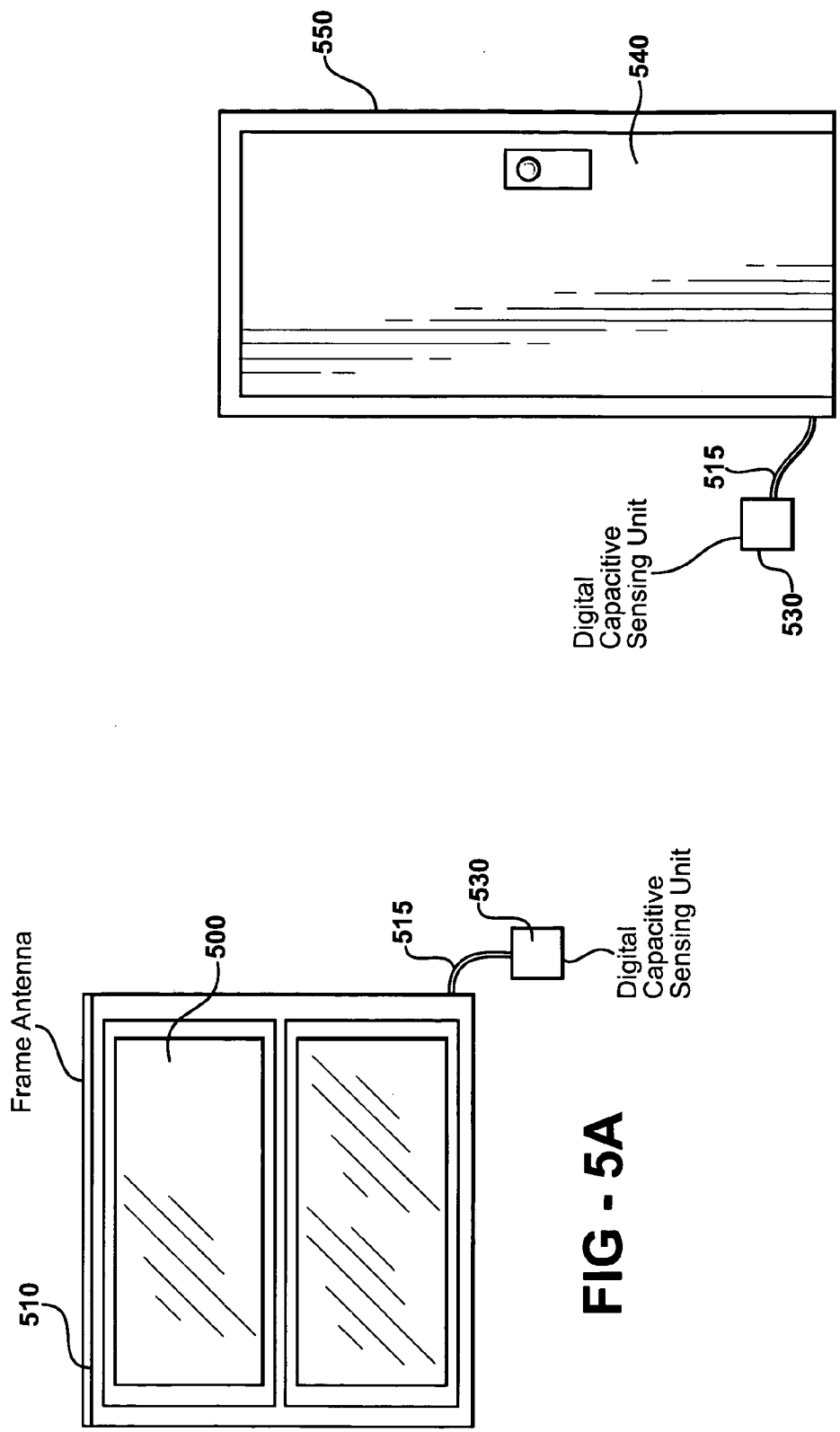

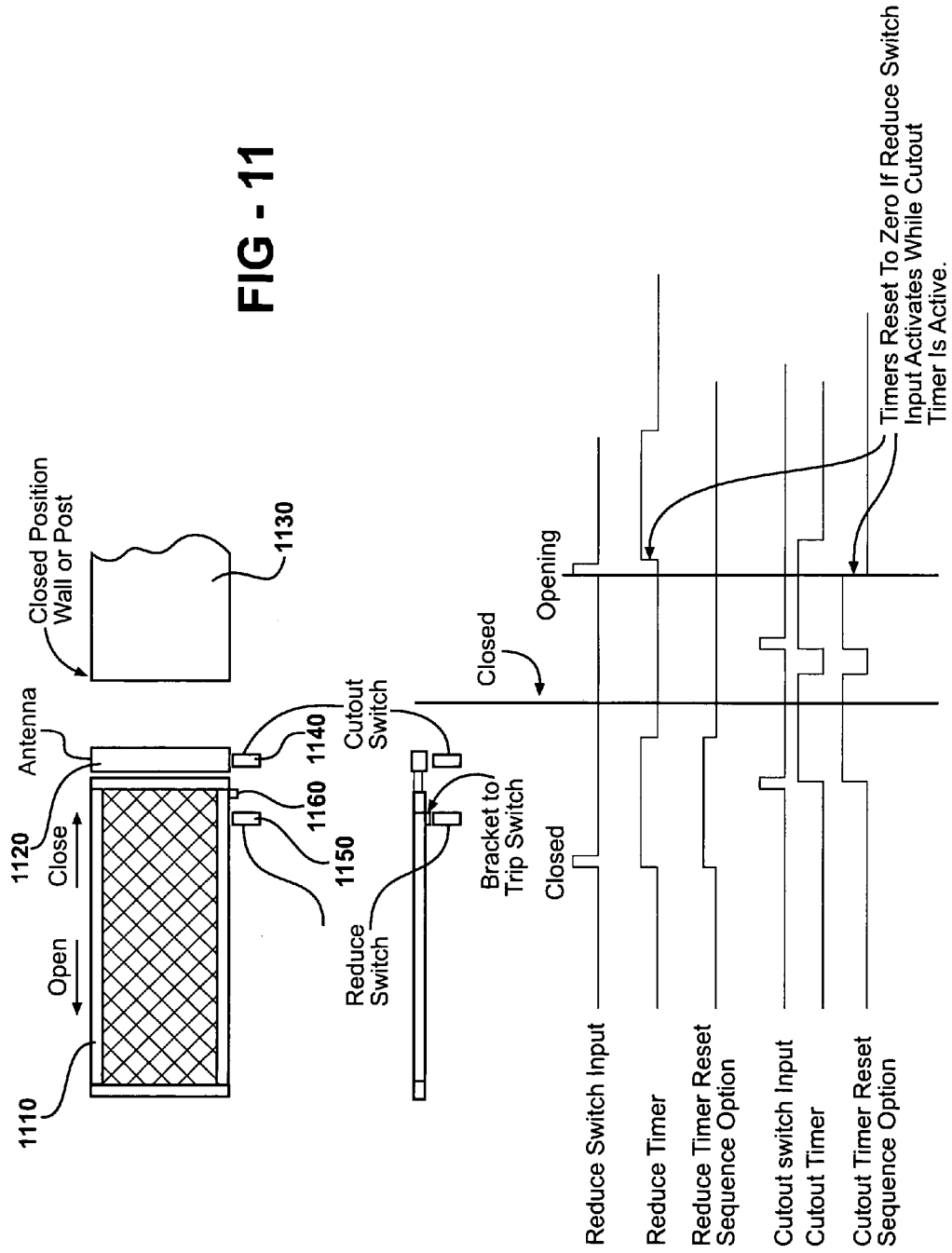

DIGITAL CAPACITIVE SENSING DEVICE FOR SECURITY AND SAFETY APPLICATIONS

REFERENCE TO RELATED APPLICATION

This application claims priority from U.S. Provisional Patent Application Ser. No. 60/608,298, filed Sep. 9, 2004, the entire content of which is incorporated herein by reference.

FIELD OF THE INVENTION

The present invention relates generally to capacitive sensing, including safety devices and security devices.

BACKGROUND OF THE INVENTION

Capacitive sensing devices detect changes in a stray capacitance through modification of a sensed field and can be used for a variety of purposes including touch screens, liquid level sensing, and short range precision measurements. These devices are useful because a small change in capacitance can be sensed and used to determine changes in the environment such as temperature changes, pressure changes, the presence or absence of an object, or changes in the mass of a fluid or object.

Capacitive measuring systems generally lack flexibility to adapt to changes in the environment or to have multiple modes of operation. Systems that are too sensitive are subject to frequent false alarms caused by minor variations in the sensor's environment while systems that are not sensitive enough are liable to fail to respond when necessary. In addition, previous devices often used fixed thresholds which were not dependent on the position of the unit or which were subject to the influence of large objects that were always near that unit. These devices are not suitable for use in systems that contain moving parts, such as a moving gate or door, nor are they flexible enough to use in systems that require multiple modes of operation, such as security systems for private homes or public buildings.

Automatic gates and doors have many uses including limiting access to parking lots or private communities, automatic garage door openers, automatic doors for public buildings and security gates that close to secure a store front. Many automatic gates either have no object detection system or have only a rudimentary system to enable an exit gate to open based upon detecting an automobile through the use of a safety loop buried in the ground. These systems suffer because a pedestrian will not activate the safety loop and person on a bicycle or motorcycle may also not have enough mass to activate it, thereby allowing it to possibly cause bodily injury to an individual Many automatic garage door systems have optical transmitters that create a path of light and detectors that detect when an object blocks the path of light, and will prevent the garage door from closing when an object is present. Furthermore, these optical detection systems are unable to detect an object in the path of the garage door that does not block the path of light and are not used when the door is opening. This enables a garage door to close on objects that are in the path of the doorway but do not block the light path, such as an overhanging automobile bumper or a person or an object that is straddling the path of light. Conventional garage door openers are designed not to react to a reversing signal when they are opening, but instead only react when the door is closing, causing an object or person caught on a garage door to be carried upwards while the door opens.

Security systems often use multiple sensors throughout an area or location including sensors that detect if a window or door is opened and motion detection devices that detect movement within a room or an area. Sensors that detect a window or door has been opened often consist of an electrical connection that is "broken" by movement of the door or window. These devices are readily defeated by breaking a window, or glass in a door, and entering through the resultant hole. Security systems using motion detection devices lack flexibility in that any small amount of motion will cause the alarm to trigger or a person "creeping" slowly may not activate the sensor. This prevents home owners with pets, or buildings that have security guards, from using these motion detection devices. Motion detectors also cover large areas and do not allow the option of protecting a specific small area such as a painting or display in a museum.

For the foregoing reasons, there is a need for a capacitive sensing device for safety and security applications which has the flexibility to work under a large number of circumstances and be flexibly programmed.

SUMMARY OF THE INVENTION

Embodiments of the present invention include methods and apparatus related to a capacitive measuring device that adjusts to environmental changes, including changes in temperature, humidity or pressure. This allows for the ability to provide a reliable system that minimizes the number of false alarms. In one embodiment this is accomplished by varying the frequency of a reference signal as a function of environmental changes due to increased or decreased capacitance regardless of the fact that the absolute value of the capacitance may in fact have changed due to temperature changes or other environmental factors. Changes in temperature may affect other electronic components and subsystems including oscillators or dielectric couplings. The reference signal can be varied so as to maintain a constant sensitivity to objects that may enter the path of the gate or enter a security area that is being sensed.

A method of sensing an object comprises providing a sensing field signal having a sensing field frequency that is modified by capacitive coupling of the object to an antenna, comparing the sensing field frequency with a reference value to provide a difference value, comparing the difference value with a threshold value, and providing a detect signal if the difference value is greater than the threshold value. The reference value may be incremented or decremented as described elsewhere herein. The threshold value may be a function of position of the antenna or associated moveable member.

A variable threshold may be used to provide for reduced sensitivity near a closed position to facilitate object detection as the gate (in the example of a gate) moves closer to the ground in a closed position. In one embodiment a "reduced" and "cutout" sensitivity feature is used which is an area of changed sensitivity that can be programmed into the unit such that as a gate approaches the contact point or ground the sensitivity is reduced to provide for the ability to sense objects without automatically tripping an alarm because the gate is approaching a large object, and a cutout area where the gate is in fact so close to the ground that it cannot in fact sense anything, and the generation of alarms is suppressed.

As will be discussed, in a digital system a variety of techniques can be used to vary the threshold and create reduced and cutout areas within the travel of the gate. In an alternate embodiment differential measurements of the frequency can be reported out such that a separate unit and in some circumstances electronics associated with the gate or door itself can make a determination as to when the threshold should be varied due to the position of the gate or due to other factors which would require a reduced sensitivity or a cutout sensitivity threshold. Another feature of the present system is a failsafe mode such that if the cutout switch is not tripped during the full motion of the gate [at no time during the motion of the gate] it is deemed that the capacitive sensor has failed and that the gate should be opened and remains opened until addressed by an operator.

A possible feature is an ability to "relearn" the environment or reset the system upon the generation of an alarm. Once an alarm has been generated, the system can go back and determine what the nominal frequency is and then reset the reference based on that frequency and detect additional objects placed in its path or near it.

Another possible feature is an ability to transmit a differential signal indicating a change in frequency from the reference allowing a separate unit or operator to determine the appropriate threshold and when an alarm should be generated.

Another possible feature is that remote or local oscillators can be used. With use of a remote oscillator, the oscillator that drives the antenna is placed in a location close to that antenna such as the bottom edge of a garage door. This allows for the oscillator to be placed close to the antenna and avoids losses that will be incurred in sending signal from an oscillator located a long distance from the actual antenna. This feature is particularly useful when there is limited space. In one embodiment the remote oscillator allows a central unit containing the sensing and calculating electronics to be connected to one or more remote oscillators which subsequently connect to antennas. This embodiment is particularly useful where there is limited space and it is not desirable to locate the oscillators in the control unit, but to have them located remotely and close to the antenna. An advantage of this embodiment is that the oscillator itself only requires limited space as opposed to the complete set of electronics. The oscillators can be embedded in structures including lips of doors on gates such that the antenna connects directly to the remote oscillator with all of the electronics being housed elsewhere. Another application of the remote oscillator in the security industry would be to be able to place the remote oscillator behind a painting or other work of art where there is limited space.

Another possible feature is the ability to determine if the system is being spoofed by radio frequency emitting circuitry that is intending to fool the electronics into thinking that there is no capacitive load nearby. With this feature it is possible to determine if some type of radio emitting circuit is forcing the frequency to a default frequency such that no alarm will be generated when in fact a capacitive or conductive object is present. In one embodiment this is accomplished by adding a capacitor or capacitive load into the resonance circuit to cause the frequency to change. If such change is not observed, it is assumed that the circuit is being spoofed by an external Radio Frequency (RF) signal. In another embodiment to detect spoofing, the oscillator can be turned off and the system monitored to see if a frequency is still received which would be indicative of someone injecting an RF signal to prevent monitoring of detecting presence of a capacitive object.

Embodiments of the present invention are useful in many applications including safety systems for gates and doors and security systems. A system according to the present invention can be used an object detector to prevent a gate a door from closing on an approaching object such as a person, pet, car, motorcycle or bicycle. Examples of gates include a pivot gate and a sliding gate, both of which are used to prevent/permit access to a parking lot. Examples of doors include garage doors or elevator-type doors.

Embodiments of the present invention can be used in a security system using one or more sensor to protect valuable objects or to sense a person or object approaching a window, door or restricted area. The security system has an easily adjusted sensitivity enabling the prevention of false alarms and enabling an operator to program multiple settings for the system based upon expected conditions. Examples of security systems include gallery type systems, in which objects are on display, to prevent the theft of a specific object and an alarm on a door or window, to prevent unauthorized entry to a building.

These and other features of the invention will be more fully understood from the following detailed description of the embodiments, which should be read in light of the accompanying drawings.

In this respect, before explaining at least one embodiment of the invention in detail, it is to be understood that the invention is not limited in its application to the details of construction and to the arrangements of the components set forth in the description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be used as a basis for designing other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The accompanying drawings, which are incorporated in and form a part of the specification, illustrate embodiments of the present invention and, together with the description serve to explain the principles of the invention.

FIG. 1A illustrates a basis of operation of a capacitive sensing device;

FIG. 2A illustrates a pivot gate using a capacitive sensing unit;

FIG. 2B illustrates a metallic gate arm;

FIG. 2C illustrates a sliding gate using a capacitive sensing unit;

FIG. 5A illustrates a window using a capacitive sensing unit;

FIG. 5B illustrates a door using a capacitive sensing unit;

FIG. 11 illustrates a traveling gate with cutout and reduce switches for the capacitive sensing system;

DETAILED DESCRIPTION OF THE INVENTION

Figure 1B:
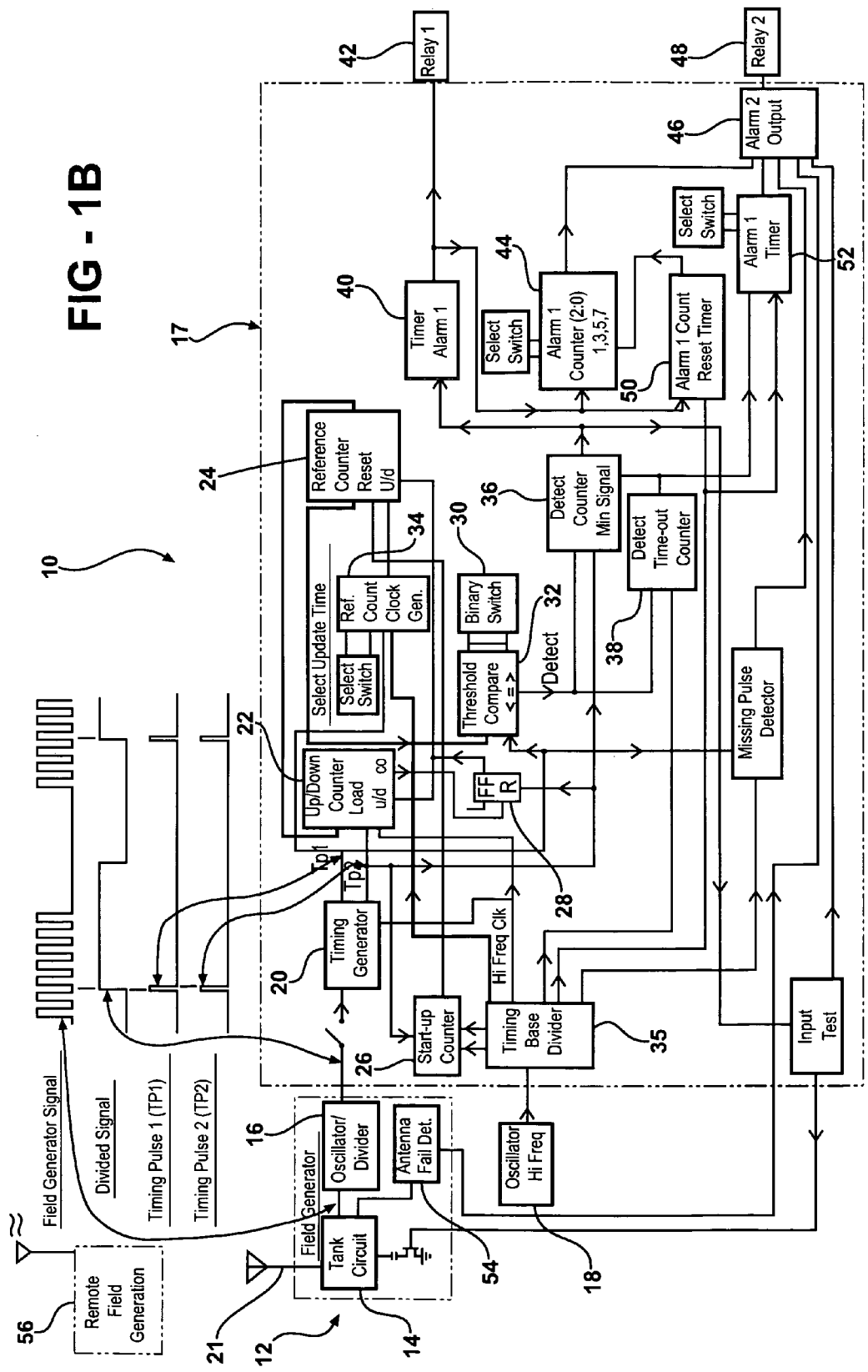
FIG. 1B illustrates a basic block diagram of a digital capacitive sensing system.

In describing an embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

A capacitive sensing system senses the presence of an object proximate to an antenna using a sensing field signal having a sensing field frequency. The capacitive sensing system can be used in security systems, to provide one or more alarms if a valuable object is removed from where it can be detected. For example, a first alarm may be generated on initial detection of the object, and a second (escalated) alarm provided on repeated (multiple detections) or prolonged (e.g. detection longer than a second or two) detection of the object. The first alarm may be a local warning, such as an illuminated lamp on the housing of the apparatus, or an audible device attached to its output, and the second alarm may be provided to a security office. The capacitive sensing system can also be used to provide an alarm when an object is detected near a moving member, such as a parking barrier gate, sliding gate, elevator door, garage door, or window. The alarm can be used for safety purposes, for example to stop or reverse motion of a moving member.

Further, the sensitivity of the system may be adjustable according to one or more conditions, such as position of the moving member, time of day, or operator inputs (for example, to put the system into a maintenance mode having low sensitivity). Systems may also have a cut-out, in which alarms and the like are suppressed even if the object is detected. For example, the cut-out may operate over a range of positions near the closed position of a door or other moving member.

FIG. 1A illustrates how an object having stray capacitance or high conductance is detected, and provides a description of the basis of operation of the system. Referring again to FIG. 1A, if a conductive object 100 comes close to a sensor 110 of a detection system, the conductive object 100 establishes a capacitive "link" to the sensor which is connected to the resonance circuit 120, which in one embodiment is comprised of an inductor 130 and parallel with some small amount of capacitance 140, the extra capacitance from the object causes a change in the resonant frequency which is then monitored as the output frequency of the system 150.

In an alternate embodiment, the changing capacitance is measured through injection of current and monitoring of voltage or through other circuits that are capable of monitoring changing capacitance without directly monitoring frequency. The advantage of monitoring frequency is that frequency has a higher resistance to noise than techniques that tend to monitor amplitudes such as amplitude of voltage or current.

FIG. 1B shows a block diagram of the sensing system 10. A field generating circuit 12, having an antenna 21, a tank circuit 14 and oscillator circuitry 16, is implemented outside the monitor circuit 17. In one example, the field generating circuit 12 runs at a frequency of 1 MHz and is divided down to a signal that is about 1 to 3 milliseconds long depending on the application. It is appreciated that other field generating frequencies may be used without departing from the scope of the invention. The divided down signal is processed by the monitor circuit 17 to determine the amount of frequency shift caused by the capacitive coupling of an approaching object to the field generating circuit 12.

A high frequency fixed oscillator 18 is used to provide the clock timing to the various internal counters. The divided down field generator signal is fed into a pulse generator 20 where it is synchronized with the high frequency clock signal 18 and thereafter converted to two short sequential timing pulses, TP1 and TP2.

TP2 is fed into the Load input 23 of an up/down field generator signal counter 22. This causes the counter 22 to be loaded with a value previously determined by a reference signal counter 24. The reference counter 24 is initialized by a startup counter 26, which causes it to count the number of high frequency clock signals in one divided down field generated signal cycle or period. Once the startup cycle ends, the reference counter 24 is incremented and decremented at a much slower rate under conditions that will be described hereinafter.

The high frequency oscillator 18 operates as the clock for the signal counter 22. Each time a new pulse from the field generating circuit 12 occurs, the signal counter 22 starts counting down from its previously loaded value received from the reference counter 24. If the count of the signal counter 22 reaches zero then a flip-flop 28 is set and the signal counter 22 is caused to immediately count up. This would occur if the frequency input from the field generating circuit 12 were lower due to someone approaching the antenna 21, thereby causing the sensing field signal to be longer. The signal counter 22 would not reach zero if the frequency of the sensing field signal is higher.

Under ideal conditions, such as a noise-free environment, the frequency of the field generator circuit 12 would match that of when it was first stored in the reference counter 24. In such cases, the signal counter 22 sets the limit or threshold as to how far the count value can vary from the zero value. This comparison takes place when TP1 is generated.

The more the count value varies from zero, the greater the difference between the reference frequency and the instant frequency. The difference may be either positive or negative. If the signal is greater than what is programmed into the sensitivity setting of the binary switch 30, an object detection signal will be generated. The signal counter 22 will then be reloaded with the reference counter value on the next occurrence of the TP2 pulse and the process will repeat thereafter. The system 10 may be set up to only detect approaching objects or only objects that are moving away as desired by looking at the output state of the flip-flop 28.

The reference counter 24 is initialized at setup, as described above. It is then switched over to be clocked up or down at a much slower rate depending on certain conditions. The reference counter value is varied in order to compensate for environmental changes, which can cause the signal from the field generating circuit 12 to drift. A reference counter clock generator circuit 34 uses different clock outputs from the timing base divider 35 for controlling how often the reference counter 24 is to be updated. The update clock input of the reference counter 24 is synchronized with TP1.

Every time the update clock occurs, the reference counter 24 will be changed up or down depending on the status of the flip-flop 28 on the output of the signal counter 22 at the time a new sensing field signal is received from the field generating circuit 12. If the count has gone past zero then the reference counter 24 will be incremented by one. If it has not gone past zero then the reference counter 24 will be decremented by one. This allows for the reference signal to be auto adjusted very slowly while preventing someone from "creeping up" or slowly moving in on the system 10.

When a detect signal is generated from the compare threshold circuit 32, it is fed into a detect counter 36 that counts the number of times it occurs within a given time period. A detect timeout counter 38 will cause the detect counter 36 to be reset if enough pulses do not occur within a time limit. The detect timeout counter 38 is reset each time a new detect signal is detected. If the count value for the detect counter 36 is exceeded, then an alarm signal is generated by the Alarm1 timer 40. The Alarm1 timer output can be used to trigger a device to warn an intruder that they have been detected.

The output of the detect counter 36 is also fed into an Alarm1 counter 44 that counts the number of times an Alarm1 timer 40 signal occurs. The Alarm1 counter 44 can be preset to allow a specified number of counts before it trips the main alarm output, Alarm2 46, which could, in security applications, be connected to the main building alarm system in security applications. The counts occur within a given time period as determined by the Alarm1 count reset timer 50 which will reset the number of counts after a given time has passed since the last alarm occurred. The Alarm1 count reset timer 50 can be set to a specified value by the user setting up the system.

A second process may also be used to determine if the Alarm2 relay 48 should be activated. The detect counter 36 output may be fed into an Alarm1 Timer 52 that will activate if an anomalous signal is present for a given amount of time, as otherwise an intruder could activate the Alarm1 signal and keep it activated so it would not increment a second or third time. Illustratively, this would be a problem if the Alarm1 count were set to trip the Alarm2 output 46 after three counts. In such case, an Alarm2 condition would never occur if the Alarm1 signal occurred only once for a long period of time. The system is configured so that an amount of time an intruder needs to be present is greater than what a nuisance signal causing Alarm1 42 to trigger, but less than what it would take to break in by an intruder. The time is programmable to different ranges by the operator to accommodate various conditions.

The Alarm1 relay 42 will be energized when a warning alarm is to be generated. The Alarm2 relay 48 will be energized as long as the system is powered up and there is no Alarm2 signal. It will only be de-energized during all Alarm2 condition causing the normally closed relay 48 contacts to open. This provides for a failsafe protection that will cause an alarm 2 signal to occur for any failure in the system 10.

Preferably, the system 10 will also have antenna failsafe detection circuit 54 that will determine if an input oscillator has stopped working or if the antenna 21 has been disconnected. If either condition occurs, then the Alarm2 relay 48 will be signaled.

Another optional feature is that the system 10 may be operative to determine when someone has locked onto the frequency of the antenna 21 and then connects an oscillator to the antenna 21 that is runs at the same frequency as the field generating circuit 12 to force the field generating circuit 12 to stay at that frequency. In such case, the system 10 includes the ability to add small capacitive values 13 to the input tank circuit 14 in the field generating circuit 12 that through the use of an electronic switch 19 should cause it to alarm. The system 10 verifies that the alarm would have occurred if the frequency shifts. If the alarm does not occur because someone is forcing the frequency to remain at a fixed value through a low impedance-driving source, the Alarm2 relay 48 would be activated.

A variation of the above embodiment involves having the option of having a remote field generating circuit 56 that can be connected to the main monitor circuit 17. In this case, the on board field generating circuit 12 would be disabled by a switch setting or automatically upon detecting the remote field generating circuit 56.

As an alternative embodiment, the system 10 may be implemented using a microprocessor or micro-controller. In such case, an internal counter is clocked by the microprocessor. A capture compare register in the microprocessor stores the value of the counter every time the divided down field generator clock signal occurs. This value is then subtracted from the previously stored value. The count difference is compared against a previously stored reference count. The reference count is updated on a periodic basis using similar algorithms as described above.

Further, the system 10 may include multiple sensitivity settings available in case it is desirable for the system 10 to be less sensitive during the daytime when a large number of people are normally present and more sensitive during the nighttime.

The system 10 could be set to a more sensitive level when people are not expected to be present. The adjusting of the sensitivity can be controlled from a remote location by using a separate control input. If the system 10 is used in safety applications on devices such as barrier gates or garage doors, then this function may be used to reduce the sensitivity when the door or gate is near the closed position. Also, the system 10 may be used in applications to automatically open a gate or door upon detecting a moving object or the presence of an object. This includes opening a gate to exit a parking lot or private community or opening automatic doors.

Another alternative to the threshold adjustment in safety applications is to use a microprocessor to memorize the profile of the frequency shift as a gate closes and then use this profile to dynamically adjust the threshold based on the door or gate position as it opens and closes. It is appreciated that as the gate moves toward the gate post or closed position, the sensing field signal changes due to the change in capacitance between the sensing element and the grounded gate post. A profile of this changing capacitance can be captured and used to dynamically reduce the system's sensitivity as the gate approaches the gate post during closing. A timing circuit may be used as a means of tracking gate position from a reference point whereby the de-sensitizing process would begin when the timing circuit corresponds to a predetermined threshold value.

The system 10 can be used in any environment where capacitive detection is desired. Examples include security systems, safety shut-off devices for automatic gates and doors, alarms for swimming pools, automobile detectors for "smart" traffic lights, and the like. Because the system 10 is so readily tunable, it can be applied in any current or future application using a capacitive sensor or an object detection system.

The system may further include a maintenance input for externally resetting the sensor and setting up the sensor without causing multiple alarm conditions. The maintenance input, when active (for example, external input relay contacts closed), will cause a maintenance relay to energize and the Alarm2 relay to de-energize approximately 1 second later. When the maintenance input becomes inactive (for example, external relay contacts opened) the maintenance relay will be de-energized and, approximately, one second later the Alarm2 relay will be re-energized. This allows the operator to set up the sensor on a new project without continually triggering the Alarm2 relay. An onboard reset pushbutton can be used to cause the system to learn a new environment at anytime during the setup. When the external reset is activated and deactivated it will cause the system to learn its environment. An on-board DIP switch setting can be provided to allow this input to only cause the system to relearn its environment when activated or deactivated, but not hold it in a reset condition while activated. For example, this may be necessary where the end user does not have the capability to monitor when the system is in a maintenance mode. A termination resistor may not be required as the system issuing the maintenance signal receives feedback from the maintenance relay operation. When in maintenance mode, the apparatus may send an alarm (such as a transmitted electronic signal) to a console, such as a security console, indicating the system is not in the operational mode.

The system may further include a sensitivity select input, for allowing the system to be put into a different or reduced sensitivity mode. This would typically occur during the day when people would normally be present and thereby decrease the chance of a false alarm. A sensing resistor will not be required on the input because the only thing they will not lose protection on the system in either mode. The system would only be more or less sensitive. The system may include one or more sensitivity controls. For example, there may be two sensitivity control switches, one for normal sensitivity (Sensitivity-1) and one for a different sensitivity operation (Sensitivity-2). The sensitivity can be selected from a remote location, and each control may be a small rotary multi-position switch.

The system may further comprise a battery/maintenance output switch, which is energized when the onboard reset switch is pressed or when a maintenance input is activated. This output switch causes a relay to become energized as long as either of these conditions exists, and provides a signal to the outside world that the sensor is being intentionally disabled for setting up or learning a new environment. A system working in the battery or wireless mode may not have the capability of operating in the maintenance mode. The same output switch can then be used for outputting a battery status signal, for example, if the battery drops below a set value.

The system may also be operational to detect spoofing by an external radio frequency (RF) signal from external emitting circuitry. Spoofing is intended to prevent detection of a nearby capacitive load by forcing the resonance frequency of a resonance circuit (or other field generating circuit) to a default frequency, such that no alarm is generated. In one embodiment, the capacitance of the resonance circuit is modified by adding a capacitor or capacitive load to the resonance circuit. For example, a switching connection can be used to connect an additional capacitor to the resonance circuit. Spoofing is detected from a lack of change in the detected sensing field frequency when the resonance circuit frequency is changed. In another embodiment to detect spoofing, the field generating circuit, such as an oscillator, is turned off, and the system monitored to see if a sensing field frequency is still detected. Spoofing is detected from the presence of a sensing field signal even when the oscillator is turned off.

Hence, further embodiments of a capacitive sensing system are operational to detect spoofing by an external electromagnetic field. Spoofing can detected using an adjustment of the the field generating circuit, such as a change in the resonance frequency of an oscillator, or disabling of the field generating circuit. With reference again to FIG. 1A, the resonance frequency can be changed by increasing capacitor 140. In this case, capacitor 140 may represent the parallel combination of a first capacitor and a second capacitor switched in parallel with the first capacitor. Spoofing can be detected by the apparent continued reception of a substantially unchanged sensing field frequency by the frequency comparison circuit, despite an adjustment of the field generating circuit.

In further embodiments of the present invention, the sensing field frequency can be frequency modulated, with the reference value with which the sensing field frequency is compared being modified in a manner correlated with the sensing field frequency modulation. The modulation can be periodic or random. Spoofing may be detected from a lack of modulation in the external electromagnetic field used to spoof the apparatus.

The antenna may comprise one or more electrical conductors, such as metal in the form of wire, conductive tape, plate, mesh (such as a wire screen), sheet, insulated cable, or other form. The antenna may comprise part of a structural component of a moving member. More than one antenna may be in electrical communication with the field generating circuit. The antenna may be associated with a moveable member, for example a conductor supported by a moveable member, or an electrically conducting portion of the moveable member may provide part or all of the antenna. For example, the moveable member may be a door, and the associated antenna may be an electrical conductor supported by an edge of the door. The moveable member may comprise a gate (swinging or sliding), or a door.

Figure 1C:
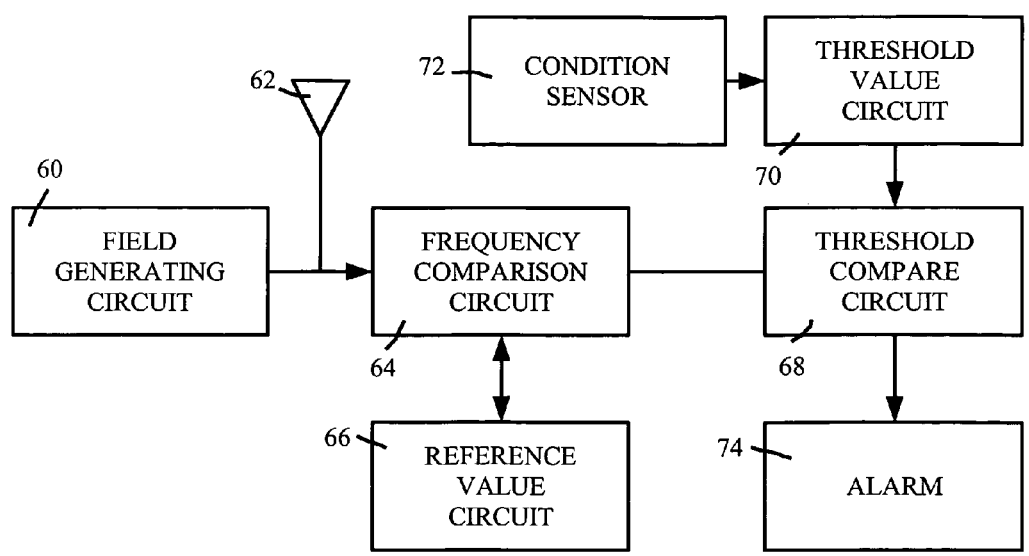
FIG. 1C illustrates a further block diagram of a capacitive sensing system.

FIG. 1C further illustrates an example apparatus for sensing an object, according to an embodiment of the present invention. The apparatus comprises a field generating circuit 60 providing a sensing field signal having a sensing field frequency, and an antenna 62, in electrical communication with the field generating circuit, the sensing field frequency being modified by a capacitive coupling between the antenna and the object. The field generating circuit 60 may, for example, comprise an oscillator such as a tank circuit having a resonance frequency that is modified (typically decreased) by capacitive loading of the antenna. The antenna 62 is electrically coupled to the field generating circuit, and radiates a sensing field into the environment of the antenna. Capacitive coupling between the antenna and an object, if the object is proximate to the antenna, modifies the sensing field frequency as discussed in more detail elsewhere.

A frequency comparison circuit 64 then compares the sensing field frequency with a reference value, and provides a difference value between the sensing field frequency and the reference value. The sensing field frequency may be divided or otherwise modified before this comparison for convenience, without changing the principle of operation. The reference value is provided by a reference value circuit 66. Frequency comparison may be achieved in various ways, as will be clear to those skilled in the electrical arts. For example, the sensing field signal may be converted into a train of digital pulses, which may be frequency divided relative to the sensing field frequency. The pulse frequency may be measured as the number of pulses per unit time, or from by timing a pulse width, pulse spacing, or pulse repeat time, for example by incrementing or decrementing a counter for the duration of the pulse width.

For example, the frequency comparison circuit may comprise a counter pre-loaded with the reference value from the reference value circuit, the counter being decremented during a comparison time in response to the sensing field signal, a final value in the counter representing the difference value.

The reference value may then be modified based on the frequency comparison, with an increment in the reference value if the sensing field frequency is greater than the reference value, or a decrement the reference value if the sensing field frequency is less than the reference value. The reference value is unchanged if the sensing field frequency is the same as the reference value. The reference value is hence modified to track long-term changes in the sensing field frequency, for example to adjust for different ambient conditions. The increment or decrement of the reference value may be substantially independent of the difference value, and may be a single count, so that, for example, the effect of noise spikes is minimized.

A threshold compare circuit 68 compares the difference value from the frequency comparison circuit with a threshold value from the threshold value circuit 70, and a detect signal is provided, representing sensing the object, if the difference value is greater than the threshold value. The detect signal is passed to an alarm 74, and an audible or visual alarm may be activated if an object is detected. In other applications, the alarm may be activated if the object is removed. The detect signal may also be used to stop any motion of a moving member, such as a gate, automatic door, or the like. The frequency comparison circuit, threshold compare circuit, and threshold value circuit preferably comprise digital circuits.

A condition sensor 72 provides a condition signal, which can be used to modify the threshold value used, or to suppress provision of an alarm. The condition sensor may comprise one or more sensors and/or inputs, the condition signal allowing the threshold value to the changed. The condition sensor may comprise a position sensor associated with a moveable member on which the antenna is supported, or which forms part of the antenna. A position sensor may comprise one or more switches, provides a position signal relating to the position of the moveable member on which the antenna is located, or otherwise relating to the position of the antenna. The position information can then be used to modify the threshold value provided by the threshold value circuit 70 to the threshold compare circuit 68. Hence, the sensitivity of the apparatus may be adjusted over different positions, or ranges thereof, of a moveable member. If the threshold value is relatively high, the apparatus sensitivity is low, as then a relatively large change in sensing field frequency will then be needed to give a difference value greater than the threshold value. A range of positions proximate to a closed position may be associated with a higher value of the threshold value. The condition sensor may comprise a sensitivity select switch, such as discussed in more detail above. For example, an operator may select a low sensitivity mode of operation, the system then using a higher value of threshold value. The system may have a maintenance mode, in which sensitivity is low. In this context, low sensitivity may correspond to either an increase in the threshold value or a suppression of an alarm.

The condition signal may suppress provision of an alarm, for example by preventing a detect signal being provided even if the difference value is greater than the threshold value. Hence, the condition sensor may comprise a cut-out switch, described in more detail below.

In a security application, the detect signal may be provided when an object is removed from a location proximate to the antenna. The object may comprise a conductive material, or have a conducting material attached or otherwise associated with it. If a conducting object is removed from the sensing field, the sensing field frequency typically increases, and if the increase is greater than a threshold value, a detect signal and an alarm provided. In contrast, the sensing field frequency typically decreases when an object (e.g. someone or something) approaches the antenna. Apparatus according to the present invention can detect (and distinguish) an increase or decrease in frequency. The alarm provided may be modified according to whether the frequency increases or decreases outside of the threshold range. The sign of frequency change (increase or decrease) may be encoded in the detect signal.

There may also be a cutout range of positions, in which sensing of the object (for example, as indicated by an alarm), is suppressed. In this case, the position information can be used to either raise the threshold to a very large value, or to otherwise suppress an alarm or other apparatus response to detection of an object.

The apparatus may further comprise a communication module operable to transmit a detect signal to a remote location, such as a security office or police station. The apparatus may further comprise a smoke detector or fire sensor, so as to provide a combined physical security and fire monitoring device.

In other embodiments, the condition sensor may provide condition information such as time, temperature, humidity, presence of automobiles or other objects, or other conditions that may be used to modify the threshold value. For example, the threshold may be higher during normal working hours, and lower at night, the condition sensor being a clock.

The threshold value may be stored as a function of position of a moveable member, for example in a memory device, or may otherwise be preprogrammed into supporting circuitry. The position at any time may be determined from switch signals received and a time since the last switch signal, for example knowing the speed of a moveable member. The speed may be determined by time intervals between successive switch activations.

The frequency comparison between the sensing field frequency and the reference value may take place over a comparison time, for example by comparing counts from a divided sensing field signal with a stored value in a counter. Alternatively, a counter may operate during the width of a pulse derived from the sensing field signal, or over a pulse spacing or pulse repeat time. In this example, the reference value is modified, if necessary, at the end of each comparison time, so that the reference value update time is the same as the frequency comparison time, though this need not be true. The reference value update time can be chosen so as to allow the reference value to track changes in the sensing field frequency that arise due to changes in ambient conditions, or through any process on a time scale less than a typical object approach time, while retaining the ability to detect objects approaching the antenna.

The various circuits and alarms may form a unitary device in a single housing, or components may be separated. For example, the antenna and field generating circuit may be remote, and the sensing field frequency transmitted to the frequency comparison circuit by any desired manner, such as over a cable or wireless communications link. Apparatus according to embodiments of the present invention comprise an antenna, which may be supported by or comprises a portion of a moveable member. The moveable member may be part of a sliding or swinging gate, other sliding or swinging barrier, door, window, other access control device, or other item.

Figure 1D:
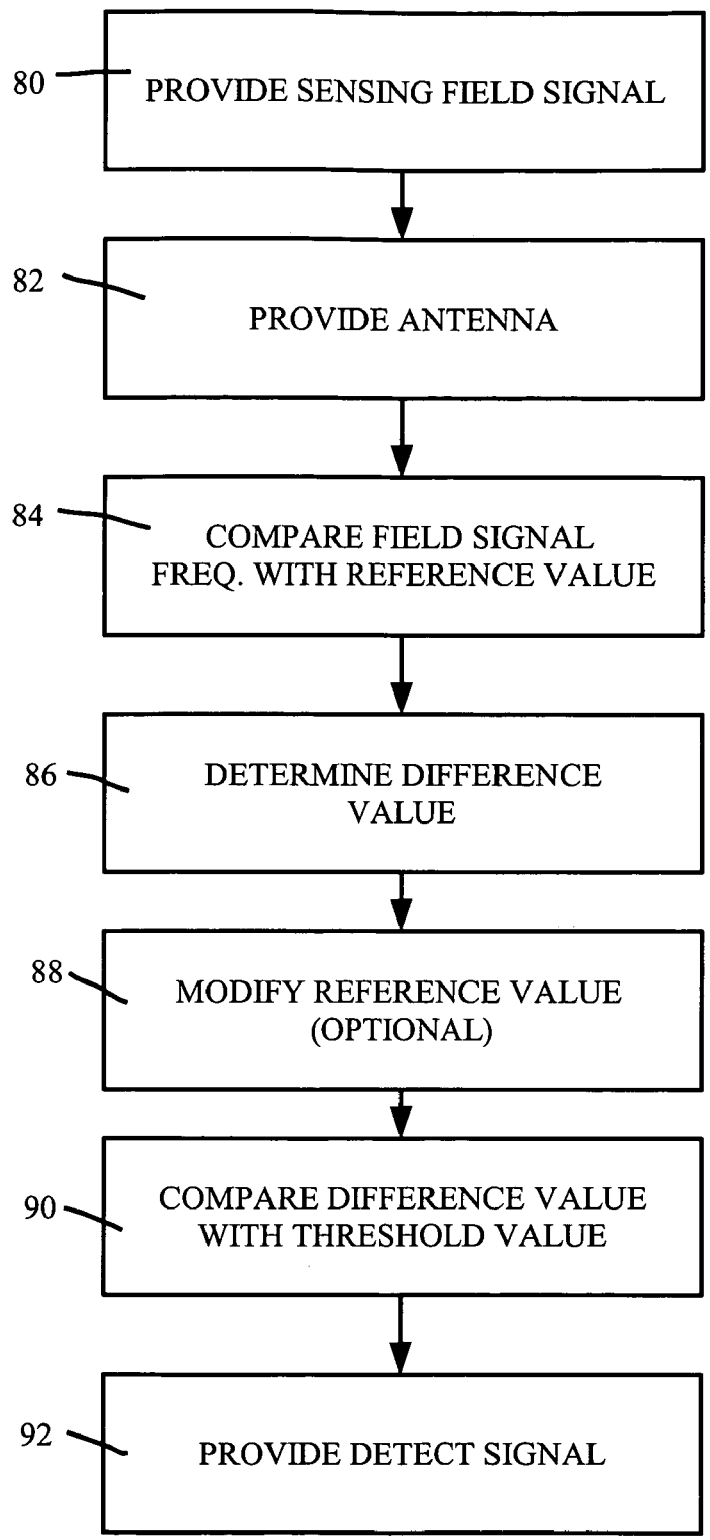
FIG. 1D illustrates a sensing method.

FIG. 1D illustrates a method of sensing an object according to an embodiment of the present invention. Box 80 corresponds to providing a sensing field signal, having a sensing field frequency. Box 82 corresponds to providing an antenna, so that capacitive coupling between the antenna and the object, if the object is proximate to the antenna, modifies the sensing field frequency. Box 84 corresponds to comparing the sensing field frequency with a reference value. Box 86 corresponds to determining a difference value between the sensing field frequency and the reference value. Box 88 corresponds to modifying the reference value (incrementing or decrementing) if necessary in response to ambient condition changes or other sources of frequency drift in the sensing field signal. Box 90 corresponds to comparing the difference value with a threshold value. Box 92 corresponds to providing a detect signal, representing sensing of the object, if the difference value is greater in magnitude than the threshold value. The detect signal can be sent to an alarm system.

Safety Systems

FIG. 2A illustrates one possible embodiment of a parking barrier gate using a digital capacitor sensor. Arm 200 moves up and down on pivot 210 which is supported on base 240. Arm 200 has an antenna 220 mounted thereon and antenna 220 transmits signals over cable 225 to digital capacitive sensing unit 230. Although the figure illustrates antenna 220 as being attached to digital capacitive sensing unit 230, in an alternative embodiment the antenna can transmit signals wirelessly to the sensing unit.

In one embodiment, arm 200 is comprised of non-metallic and non-conductive material such as wood, fiberglass or plastic. In this embodiment, antenna 220 is an adhesive foil strip that is attached to bottom side edges of arm 200, extends around the tip of the arm 200 and back down to the other side of the arm 200 stopping opposite where it started. It is desirable to have antenna 220 starting at least 12 inches (300 mm) above the base 240, when the arm 200 is in the upright position.

FIG. 2B illustrates a metallic gate arm 205 having an insulator plug 207. In this embodiment, the arm 200 is comprised of metal or anther conductive material and functions as the antenna 220, alleviating the need for a separate antenna. The insulator plug 207 is used to insulate the upper portion of the arm from the base of the arm, preventing the base 240 from interfering with the antenna, and the insulator plug is connected to the digital capacitive sensing unit 230, located in the base 240, by a cable 225. Cable 225 can be a coaxial cable or any other flexible conductive cable.

Although the gates illustrated in FIGS. 2A and 2B both have a straight arm, the present invention can also be used with gates having a folding arm, for example by attaching an antenna to both arm sections, and connecting the antenna with a cable.

FIG. 2C illustrates one possible embodiment of a sliding gate using a digital capacitor sensor. Gate 250, having antenna 260 mounted thereon, slides towards (in closing) and away from (in opening) a structure 280. The gate slides on wheels 270. Antenna 260 transmits electrical signals over cable 265 to digital capacitive sensing unit 230. Structure 280 may be a non-moving object such as a wall or a post or in an alternative embodiment. Although the figure illustrates antenna 260 as being attached to digital capacitive sensing unit 230 via cable 265, in an alternative embodiment the antenna can transmit signals wirelessly.

In both FIG. 2A and FIG. 2C, the antenna is illustrated as being directly mounted on the arm 200 or the gate 250. In embodiments where the arm or gate are metal or another conductive material, the antenna may include a mounting structure, for example as described in U.S. Pat. No. 6,819,242 to Michael.

Figure 3A:
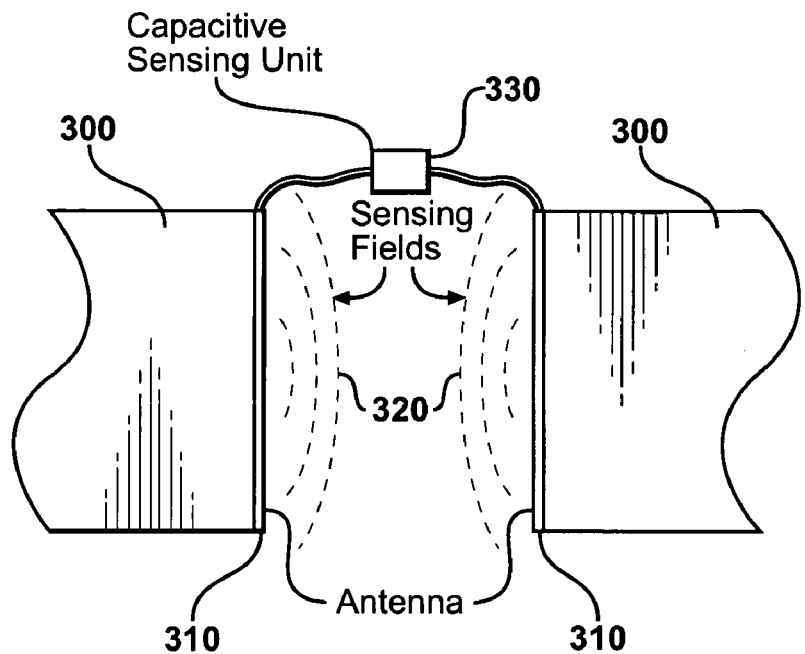
FIG. 3A illustrates an elevator-type gate or door.

FIG. 3A illustrates one possible embodiment of an elevator-type gate or sliding door. In this embodiment, the gate is comprised of two doors 300 that move towards and away from each other. Each door 300 has an antenna 310 mounted thereon, and each antenna 310 has a sensing field 320. The antenna transmits electrical signals to the capacitive sensing unit 330. If an object (not shown) interrupts one of the sensing fields 320, the capacitive sensing unit 330, detects the change in the field and transmits a signal to the door controller (not shown) to prevent the door from closing.

Figure 3B:
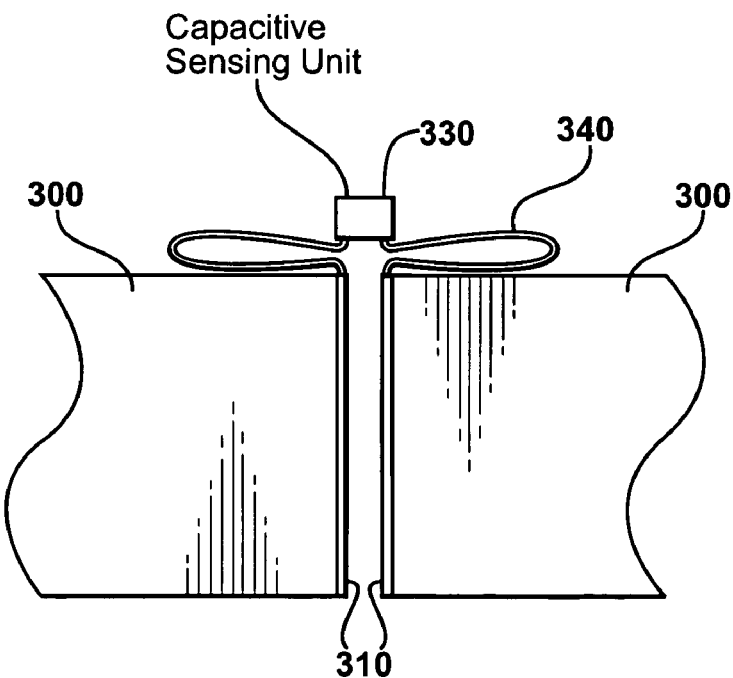
FIG. 3B illustrates the gate or door in FIG. 3A in an almost closed position.

FIG. 3B illustrates the door in an almost closed state. At a determined threshold (for example 1 mm) the capacitive sensing unit 330 can be shut-off allowing the door to close. Also, as the doors 320 near the closing state, the sensitivity may be adjusted to compensate for the fact that the edge of each door 320 will interrupt the sensing field 320 of the opposing antenna 310.

Although the doors illustrated in FIG. 3A and FIG. 3B are referred as gate doors, the doors can be any type of mechanically moving sliding doors, including but not limited to, elevator doors, subway or train doors, sliding doors on vans, or automatic doors used in retail facilities.

Figure 4A:
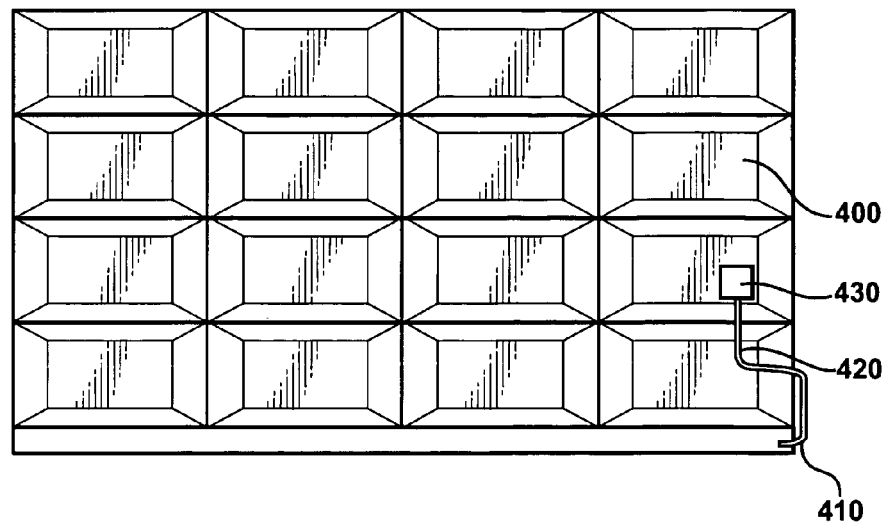
FIG. 4A illustrates a garage door using a capacitive sensing unit.

FIG. 4A illustrates a garage door 400 using a digital capacitive sensing unit 430. An antenna extrusion 410 having an antenna therein is attached to the bottom of the door 400 and connected to a cable 420 to transmit electrical signals to a capacitive sensing unit 430. The antenna extrusion unit 410 comprises rubber or a similar material that both insulates the antenna from the garage door and suppresses vibrations on the antenna during movement of the door. The cable 420 may be a coaxial cable or any other cable that is both flexible and conductive, or a conductive material such as a metal strip. The garage door 400 may be constructed of any material, including but not limited to, metal, wood or fiber glass. The garage door 400 may have sections that fold and unfold while moving or be a single panel door.

Figure 4B:
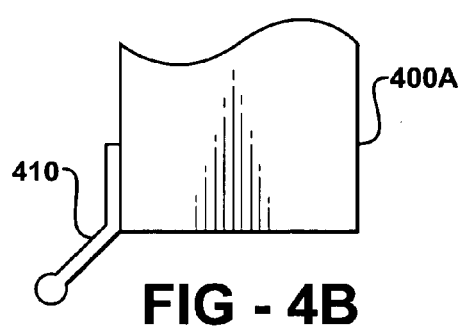
FIG. 4B illustrates a specific way to attach an antenna to a garage door.
Figure 4C:
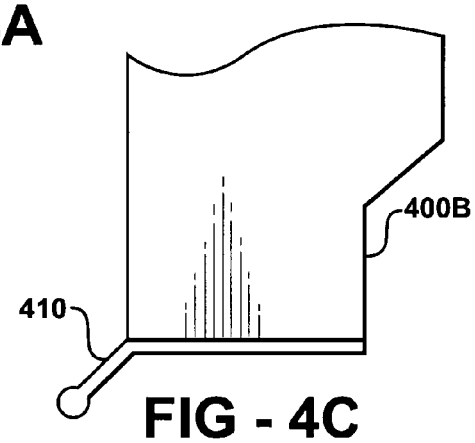
FIG. 4C illustrates a specific way to attach an antenna to a different type of garage door.
Figure 4D:
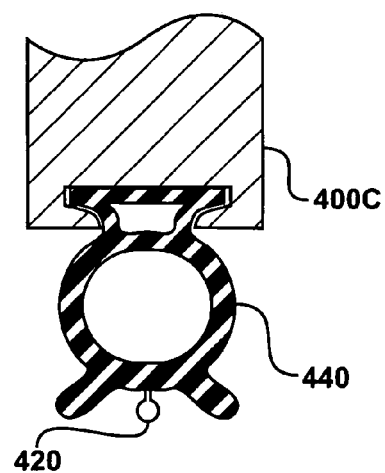
FIG. 4D shows an antenna supported by an astragal extrusion.

FIG. 4B illustrates the connection of antenna extrusion 410 to one type of garage door 400A. FIG. 4C illustrates the connection of antenna extrusion 410 to a second type of garage door 400B. FIG. 4D illustrates the antenna 420 being implemented directly into an astragal extrusion 440 or seal that would normally be used on the closing edge of the door 400C. In this case the customer's astragal design would be modified to accommodate the antenna.

Although doors 400, 400A and 400B, are referred to as garage doors, these doors may be any type of door or gate that is mechanically moved up and down to open and close a portal. This includes, but is not limited to, security gates for store fronts or warehouses, doors to loading docks, and doors to public storage facilities. Some garage doors have an angle iron across the back of the door, and the antenna may be supported by this.

There are many other types of gates or doors other than those illustrated in the figures above. For example, single arm gates that swing outward or inward and dual gates that both swing outwards or inwards. The above sensor can be used with any type of automatic gate or door to prevent the gate or door from opening or closing on an object, person or animal.

Security Systems

FIG. 5A illustrates one embodiment of a security system including a window 500 connected to a digital capacitive sensing unit 530. In this embodiment the window frame 510 acts as the antenna and is connected to a cable 515 to transmit electrical signals to the digital capacitive and sensing unit 530. Alternatively, a foil antenna, as described above with respect to FIG. 2A, can be attached to frame 510.

FIG. 5B illustrates one embodiment of a security system including a door 540 connected to the digital capacitive sensing unit 530. In this embodiment the door frame 550 acts the antenna and is connected to a cable 515 to transmit electrical signals (such as a capacitance) to the digital capacitive sensing unit 530. Alternatively, a foil antenna, as described above with respect to FIG. 2A, can be attached to frame 550.

Although the digital capacitive sensing unit 530 is illustrated as being connected to cable 515, in an alternative embodiment, the digital capacitive sensing unit works wirelessly and cable 515 either need not be present, or is provided for back-up purposes.

Figure 6A:
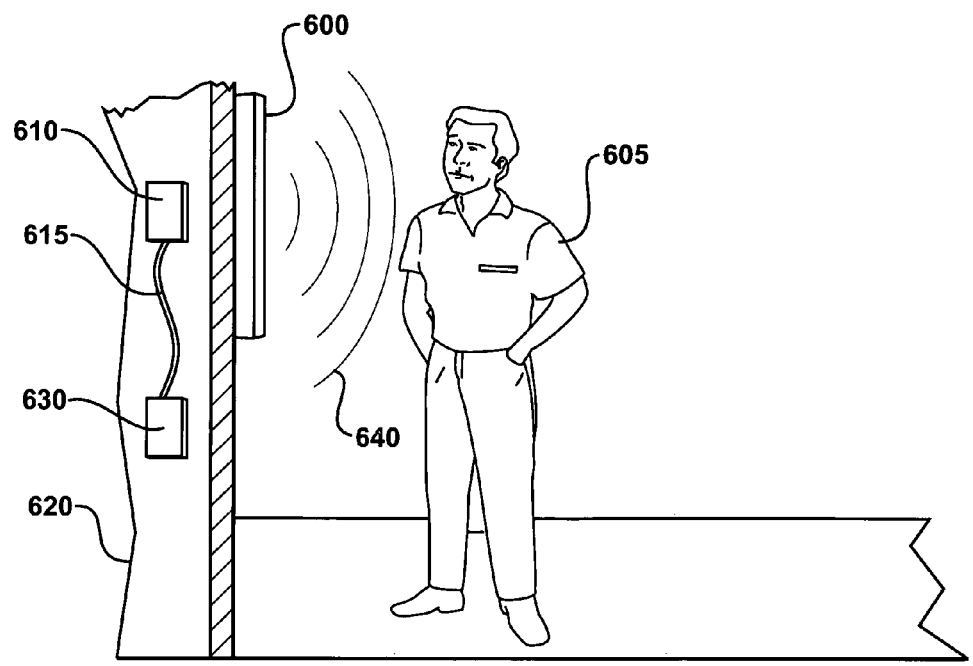
FIG. 6A illustrates one embodiment of an exhibit type security system.

FIG. 6A illustrates one embodiment of an exhibit type security system which includes security systems used to protect one or more objects. Object 600 is located in close proximity to wall 620 and may be an object, such as a mirror or painting, which is typically hung on a wall. Antenna 610 is located behind the surface of the wall 620 or just below the surface, in close proximity to the object 600 and has sensing fields 640 that detect the presence of a second object 605, in this example a person. Antenna 610 is connected to cable 615 to transmit signals to digital capacitive sensing unit 630. The system may provide an alarm on detection of the second object (person), and/or if the object 600 is removed.

Figure 6B:
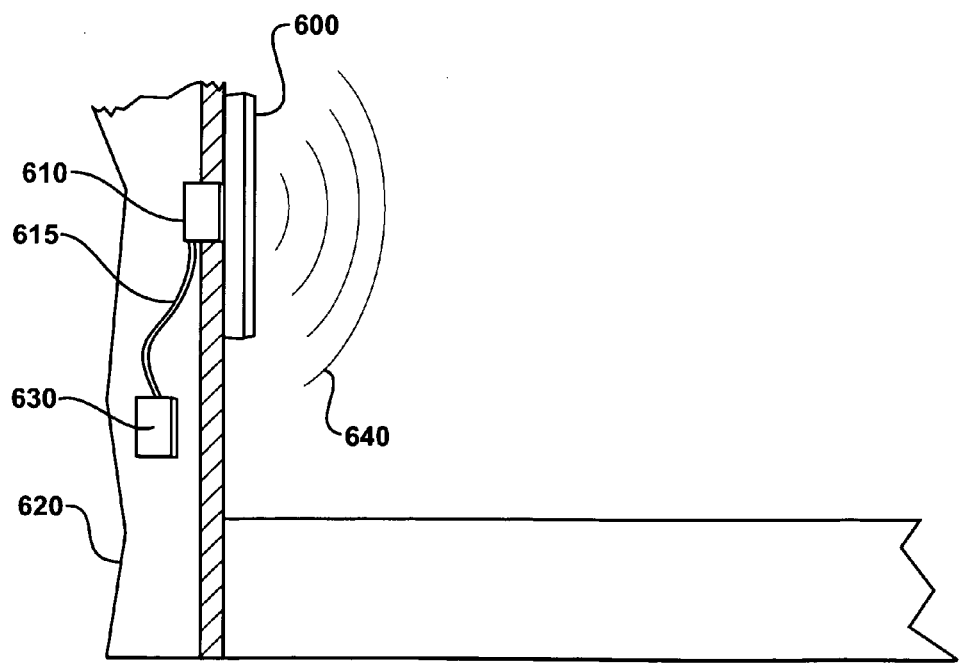
FIG. 6B illustrates a second embodiment of an exhibit type security system.

FIG. 6B illustrates a second embodiment of an exhibit-type security system. FIG. 6B differs from FIG. 6A only in that antenna 610 is attached either directly to the protected object 600 or to the outside surface of the wall 620.

Figure 6C:
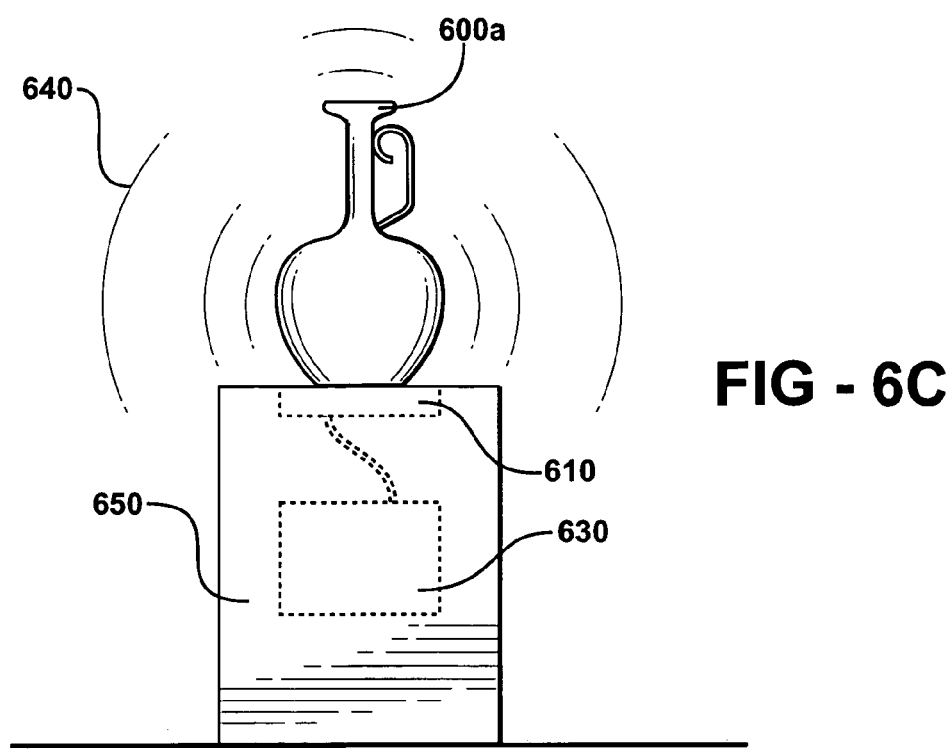
FIG. 6C illustrates a third embodiment of an exhibit type security system.

FIG. 6C illustrates another embodiment of an exhibit-type security system. Object 600a sits on support 650. Antenna 610, located within support 650, has sensing fields 640 that detect the presence of an object other than object 600a. Antenna 610 is connected to cable 615 for transmitting signals (such as capacitive) to digital capacitive sensing unit 630.

In alternative embodiments, antenna 610 is located either directly on object 600a or on an outside surface of support 650.

Figure 6D:
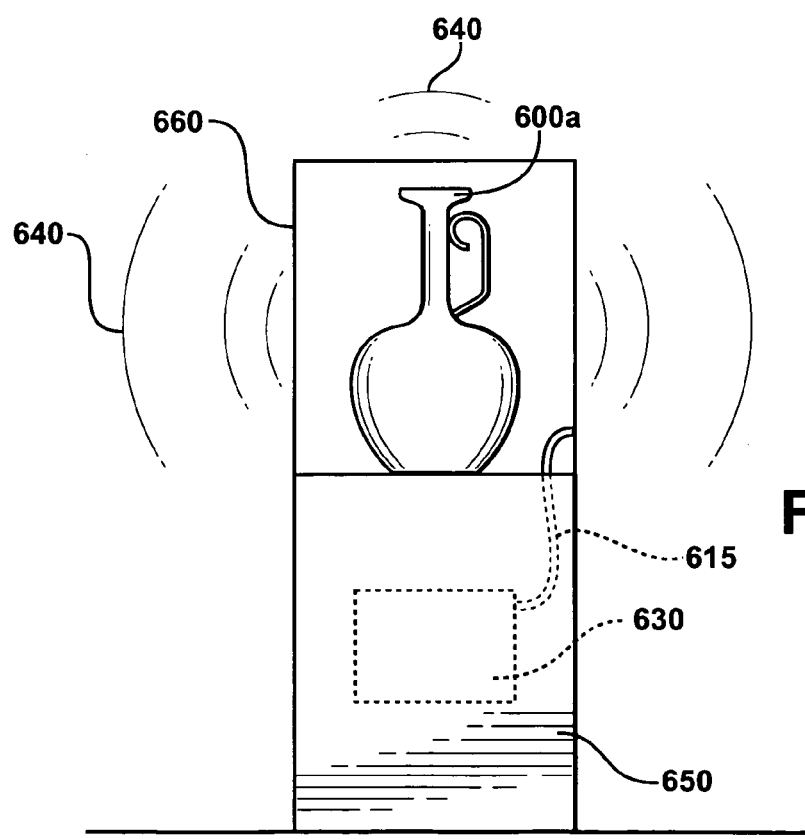
FIG. 6D illustrates a fourth embodiment of an exhibit type security system.

FIG. 6D illustrates another embodiment of an exhibit-type security system. Object 600a sits on support 650 and is surrounded by a protective casing 660 comprised of glass, Plexiglas, plastic or any other suitable material. Protective casing 660 may act as antenna having sensing fields 640, as described above in reference to FIG. 5A, and is connected to cable 615 for transmitting signals (such as capacitance) to digital capacitive sensing unit 630. Alternatively, protective casing 660 may have an antenna attached thereon or an antenna may be placed on or in support 650.

Figure 6E:
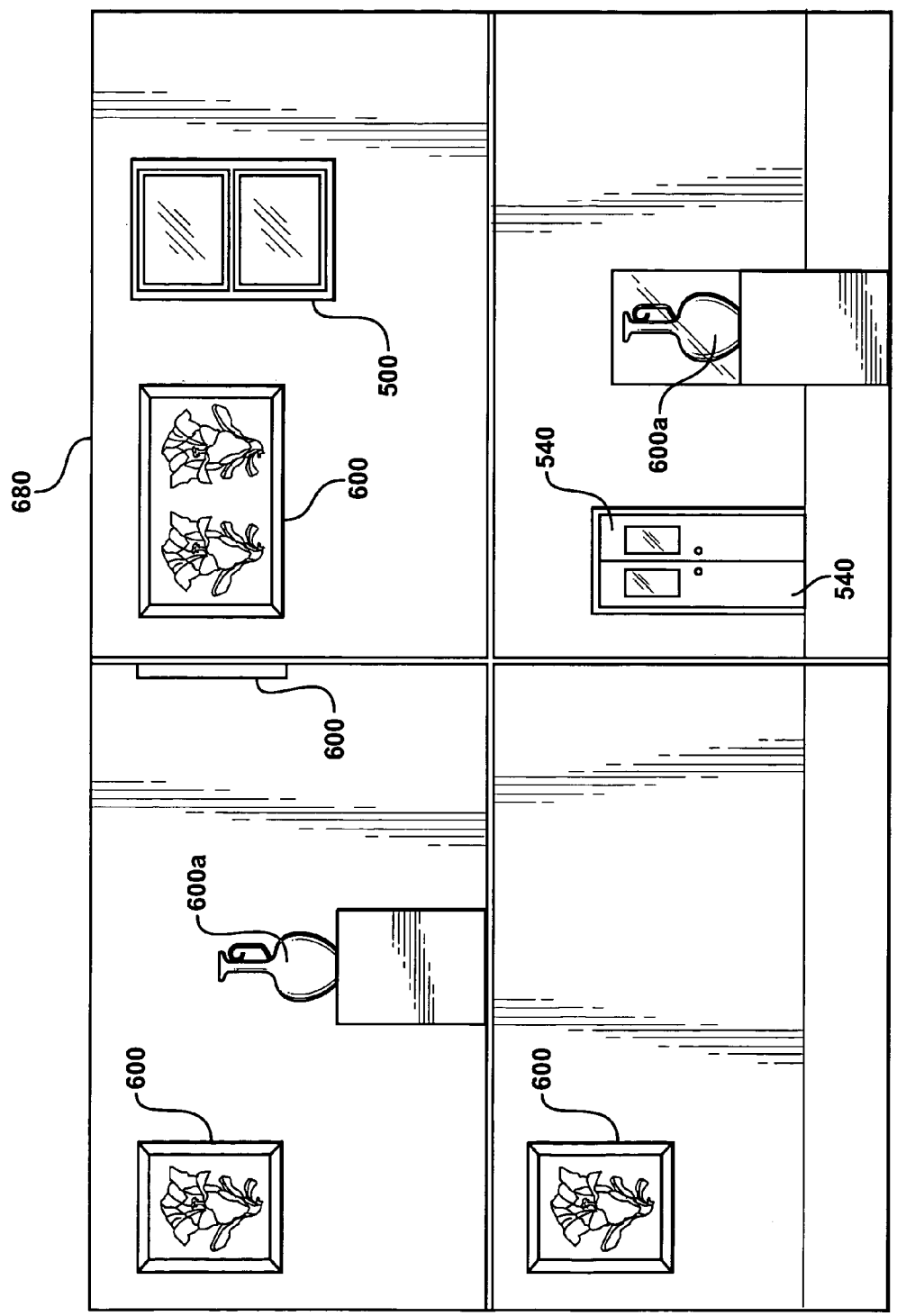
FIG. 6E illustrates a building security system.

FIG. 6E illustrates a security system for an entire building 680 or part of a building, such as a wing in a museum. The security system includes digital capacitive sensors connected to one or more windows 500, one or more doors 540, one or more hanging objects 600 and one or more "sitting" objects 600a. All of the digital capacitive sensing units may transmit signals either through wires or wirelessly, to a system controller (not shown).

Additional conductive material (such as a metal sheet) and/or a ground connection may be added to a valuable object to increase capacitive loading to the antenna.

Operation of Systems

Figure 7:
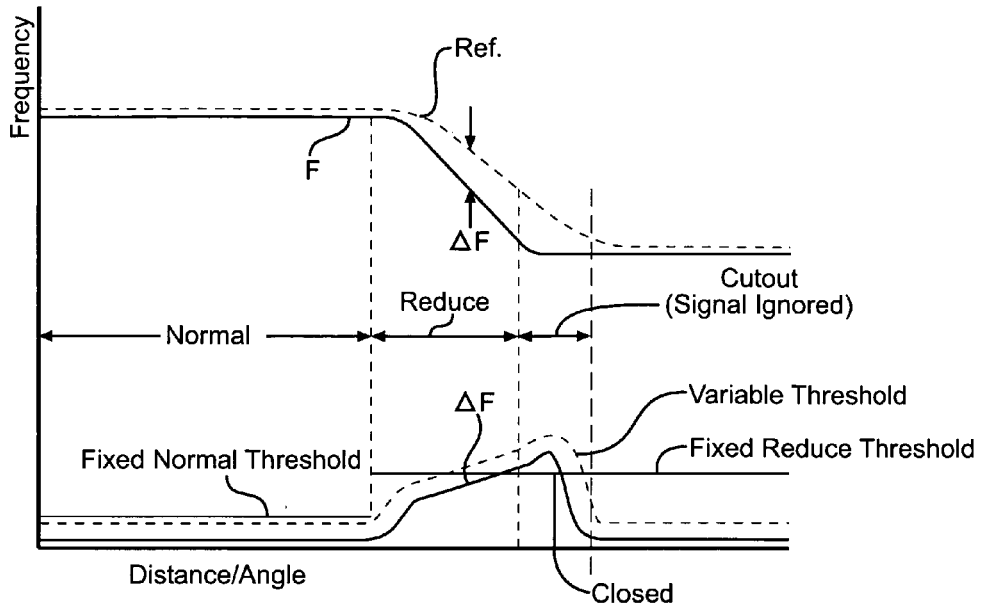
FIG. 7 illustrates a frequency vs. distance chart for the capacitive sensing unit used with a gate.

FIG. 7 illustrates a frequency that would be read out of the system as a function of position either in terms of the distance the gate or door travels, or in the case of a swinging arm, the angle with which the arm makes with the pedestal. Again referring to FIG. 7, a frequency signal F is generated and tends to drop as the door and antenna mounted to the door approach the ground. This decrease in frequency ($\Delta F$) is due to the presence of the ground and not the presence of a foreign object. The system has a reference frequency (or reference value) which is in essence a low pass version of the direct output frequency. The reference frequency exists such that as the door approaches the ground, changes in capacitance can still be detected but are not detected on an absolute basis but rather on a reference basis. The reference frequency also exists in order to deal with changes in temperature or other changes in the system that cause an absolute change in frequency but which are not indicative of the presence of a capacitive or a conductive object. This in fact forms a floating reference as opposed to a fixed reference which would be an absolute frequency against which the output of the system was measured. Referring to the bottom of FIG. 7, it can be seen that a fixed threshold is established which will be the threshold above which a change in frequency will cause the generation of an alarm because there is a capacitive or a conductive object present. As the door or gate closes, the change in frequency will naturally decrease due to the approaching ground. Because there will be a change in frequency that occurs simply due to the presence of the ground, it is useful to establish either a variable threshold or regions of reduced and cutout sensitivity, respectively, such that entrance of objects in the pathway can still be measured but the alarm is not generated upon the simple closing of the door. If a variable threshold is used, as illustrated, the threshold actually increases when the door begins to approach the floor and enters a reduced sensitivity region which is then followed by a cutout region during which time the door is very close to the ground and the threshold is in fact then raised or a higher change in frequency is required to trip the alarm. This variable threshold can be established once the system is installed on a closure by telling the sensor to learn the environment as the door or gate goes through a normal closing cycle.

The antenna of a system according to an embodiment of the present invention may be mounted on, or comprise part of a moveable member, such as a barrier, gate, door, window, or the like. The moveable member has a position, which may vary between an open position and a closed position. The position may be an angle, or linear displacement, relative to a reference, which may be frame or other support for the moveable member. The threshold may be a function of the position, for example progressively increasing as the position approaches the closed position. The threshold may discontinuously increase at a particular position as the moveable member approaches the closed position, for example through activation of a switch or other sensor. Further, a cut-out range may be selected, over which any response to the sensing of an object (such as an alarm, or direction reversal) is suppressed.

Figure 8:
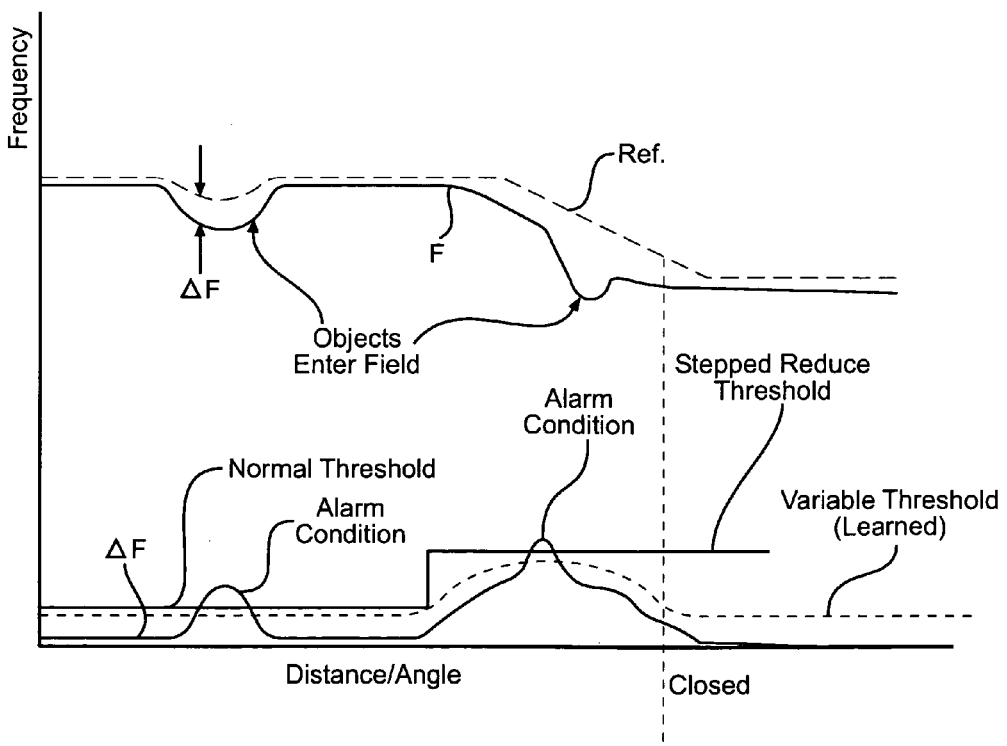
FIG. 8 illustrates the frequency of the capacitive sensing system when object enters and leaves the sensing field.

FIG. 8 illustrates the change in frequency that occurs when an object enters the field. In the situation illustrated in FIG. 8, an object, such as a person or animal, actually enters and leaves the field. This is not necessarily representative of most safety or security situations, but is shown here to illustrate operation of the capacitive sensing system when an object enters and then subsequently leaves the field. Referring to the top traces in FIG. 8, it can be seen that as an object enters the field, there is a rapid change in frequency and a subsequent slow change in the reference signal, resulting in a large difference in frequency as shown on the bottom on the trace labeled ΔF, which results in an alarm condition at the first instance of an object entering the field. In the second instance of an alarm entering the field, the threshold has been increased because the door is approaching the ground, but even though the threshold has been increased, the rapid entry of the object into the field causes an alarm condition. In the case the system is being used with an automatic door or gate, the alarm condition will cause the gate or door to stop moving or stop and reverse, in either direction, while the alarm condition remains.

Figure 9:
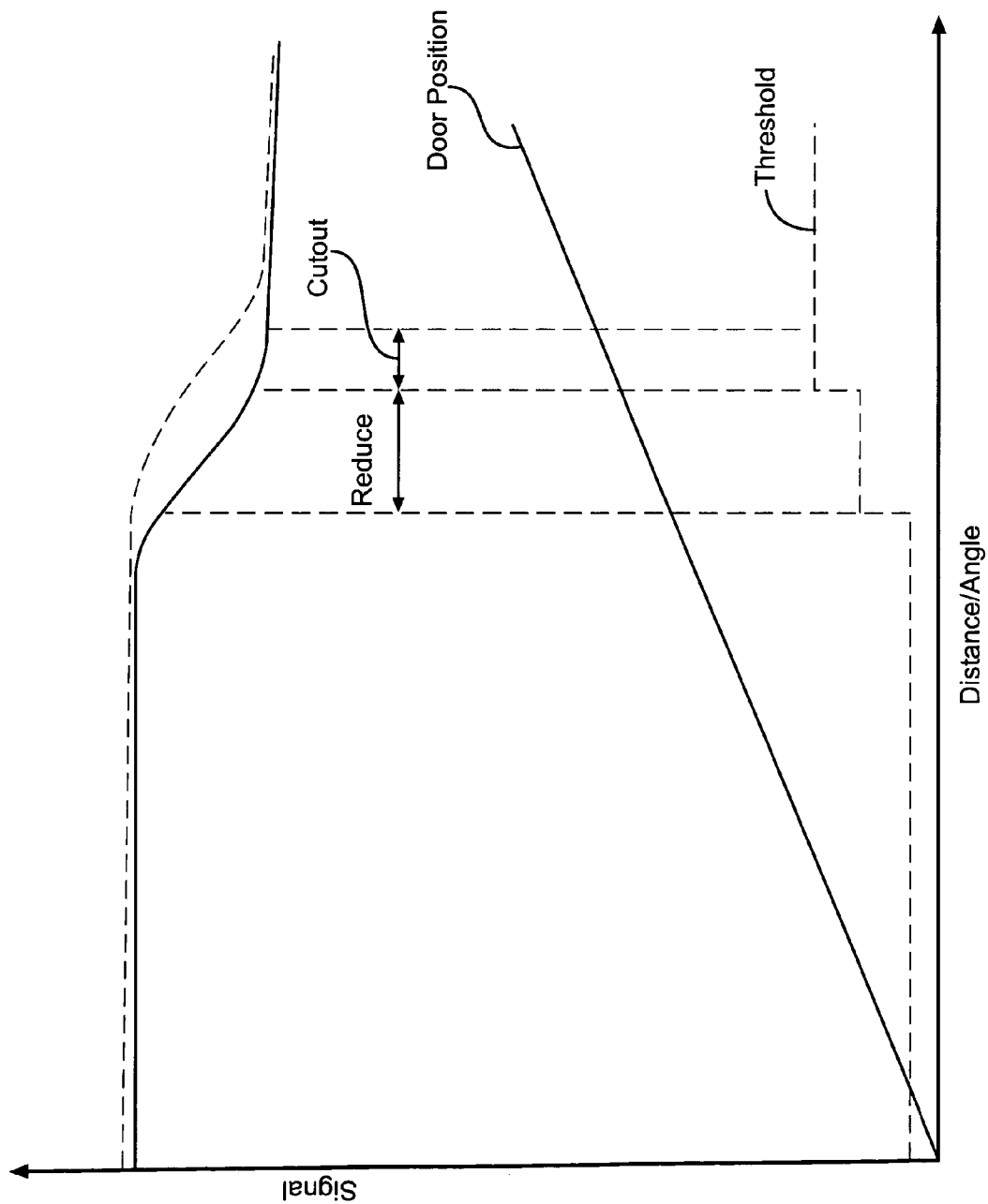
FIG. 9 illustrates the frequency of the capacitive sensing system based on door/gate position.

FIG. 9 illustrates the use of door position information, along with the change in frequency, to set different thresholds. In this embodiment, as the door is closed, the position is reported out and as the door approaches the ground, the fact that it is closer to that conductive or capacitive object is taken note of by the system and the threshold is increased. Similarly, when the door approaches its last several inches of travel to closure, a cutout region is entered and the threshold can then again be increased. In one embodiment, the door position is reported to the digital capacitive sensing device which itself makes calculations based upon the door position and sets thresholds accordingly. In another embodiment, the change in frequency itself is simply reported out to the unit that is controlling the door, and that unit subsequently makes a calculation as to where it should set thresholds and generate alarms in stock motion due to the presence of an object as detected by the capacitive sensing system. In yet another embodiment, the digital capacitive sensing system learns the change in frequency over the travel of the door and once that is learned, creates a calibration signal against which it can compare a change in frequency. This is useful from the standpoint that each application and installation is learned by the sensing system, and any nuances in the change in frequency are learned such that the system can be made to be very sensitive to changes in frequency even though there may be other objects present as the door closes. In this embodiment, if those objects are static, they are learned as part of the system, and the high sensitivity is maintained over complete travel of the door.

Figure 10:
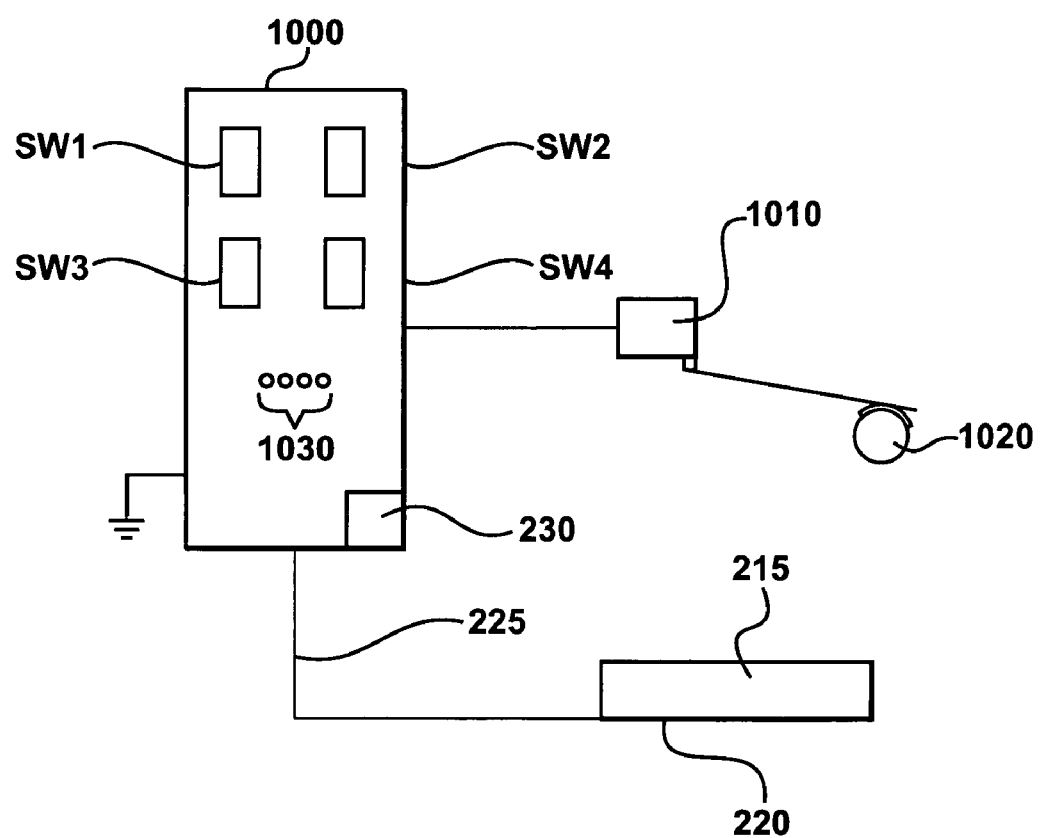
FIG. 10 illustrates a control panel for a gate using the capacitive sensing system.

FIG. 10 illustrates a gate having the capacitive sensing system including a control panel. While operating a pivot gate, for example the gate illustrated in FIG. 2A, the capacitive sensing system senses the capacitance of the pavement or ground as the arm is closing. In order to prevent a false object detection, a cutout/reduce switch 1010 may be employed to disable the alarm relay output to the controller when the closing arm 215 nears the pavement or ground. The switch 1010 may be coupled to a cam 1020 that rotates in order to move the gate arm 220 and the switch 1010 is adjusted to disable the relay when the arm 220 is in a range of about 10–15 degrees above horizontal. Disabling the alarm at this point allows the detection of objects at the lowest point in the arm's 215 travel, but avoids the unwanted detection of the pavement or ground. In a pivot gate that swings outward, this cutout switch may be unnecessary because the gate maintains a constant distance to the pavement or ground. However, in a pivot gate that swings towards (or away from) a building or other structure, a cutout switch may be used when the gate arm nears the building or structure. Control panel 1000 includes the digital capacitive sensing unit 230, an input for receiving signals from the cutout switch, an output to ground, and multiple switches SW1–SW4. Four switches are shown for illustrative purposes only, any desired number of switches may be provided. Adjustment switch SW1 is used to set up the operating frequency of the sensor and change the parameters of the antenna frequency. Reset pushbutton switch SW2 is used to reset the sensor and allow for the system to disable the alarm for a period of time, this is useful for initial set-up of the system. Sensitivity switches SW3, SW4 are used to adjust the sensitivity of the sensor in normal sensitivity, which is the sensitivity for the gate when the arm is at the top of the arc, and reduced sensitivity setting, which is the sensitivity as the arc of the gate moves towards the ground or pavement. The sensitivity switches SW3, SW4 may be rotary dials that have multiple settings, for example 10 different settings. The sensitivity switches may include a course adjustment, for example increments of 10, and a fine adjustment, for example increments of 1. If a cutout is used to disable the sensitivity for the last 15 to 20 degrees of arc travel, then the reduced sensitivity switch does not need to be present or activated. The control panel 1000 also contains indicators 1030, that may include Light Emitting Diodes (LEDs) or a Liquid Crystal Display (LCD), the indicators are useful for providing information such as status of the system, power provided, and the signal strength of the sensor. On longer arms it may be desirable to go into a reduced sensitivity mode for the last 15 to 20 degrees of arc travel and then the cutout mode at 5 degrees. This is because the far end of the gate arm may be too far from the ground for the field to sense smaller objects if the cutout is enabled at an angle of 15 degrees.

The system illustrated in FIG. 10 may benefit from an initial installation and proper setup. To initialize the installed system move or operate the gate to a fully open position and apply power the capacitive sensing system and control panel 1000. Set-up begins automatically as the capacitive sensing system "learns" its environment or alternatively a switch in the control panel 1000 may be used to start the "learning" mode. An indicator 1030 flashes, displays, or otherwise indicates the operating frequency of the antenna 220 and indicates that the system has been successfully installed and initialized and ready for operation.

If an alternative indicator, such as high pitched noise of flashing red lights (or LEDs), is present it is indicated that the system is in a "Failsafe" mode and the system is not properly installed or setup. The problems may include an antenna that is not properly installed, the antenna is not electrically connected to the sensor or the initial setup has not been properly completed.

If the system is not in the "Failsafe" mode, the indicators 1030 should indicate that the system is properly operating and whether or not an object is detected. For example, if no object is located in close proximity to the gate arm 215 two green LEDs light, while three lit green LEDs indicate that an object is located near the gate arm 215.

Once the initialization is complete, the sensitivity can be adjusted using the normal sensitivity switch SW3 and the reduced sensitivity switch SW4. The normal sensitivity is adjusted by causing the gate to close while placing an object, such as a hand or other conductive object, in the path of the gate arm 215. The capacitive sensing unit 230 should detect the object near the gate arm 215 and trigger the alarm mode causing the gate to reverse before reaching the hand or other conductive object. If the gate reaches the hand or conductive object, the sensitivity switch SW3 is adjusted to increase the sensitivity of the capacitive sensing unit 230. If the gate reverses direction before coming in close proximity to the object, for example 10–14 inches, the sensitivity may be too high causing the gate to reverse to easily and the normal sensitivity adjustment switch SW3 is adjusted to decrease the sensitivity. This procedure is repeated as necessary until the system is set to the desired sensitivity. It should be noted that gate's ability to stop rapidly and reverse directions should be taken into account while performing the sensitivity check. A gate that is slow to stop and reverse directions may make the capacitive sensing unit 230 appear to be less sensitive than the actual setting so the mechanics of the gate should be tested to determine an actual position in which breaking initially occurs.

After the normal sensitivity mode is adjusted to the desired sensitivity the reduced sensitivity mode can be adjusted by repeating the steps described above with normal sensitivity adjustment but with the object in the reduced sensitivity area. After verifying that the reduced sensitivity mode has been properly tuned one last procedure may be performed to obtain a proper reduced sensitivity setting. Initially, close the gate and place an object at a position in the reduced sensitivity area, for example approximately 8 inches below the bottom of the gate arm 215. Next, open the gate and then close the gate arm 215, while leaving the object located at the position in the reduced sensitivity area. If the sensitivity is set properly, the gate arm 215 should move to the final closing position, while if the gate stops and reverses direction the sensitivity should be adjusted. The 8 inch distance is for exemplary purposes only and any final safe distance may be used for this adjustment.

FIG. 11 shows a sliding or traveling gate 1110, and an antenna 1120 proximate to the end of the gate that approaches the closed position with the gate against a wall 1130. A reduce switch 1150 and cutout switch 1140 are activated by a bracket 1160 on the lower portion of the gate. The relationship between the switches and the switch activation by the bracket is shown again below the main illustration of the gate. Signals provided by the reduce switch input, and cutout switch are also shown, along signals corresponding to a reduce timer, cutout timer, and cutout timer reset sequence option. The reduce switch 1150 is activated on closing and opening the gate, likewise for the cutout switch.

FIG. 11 illustrates the sequencing of reduced and cutout threshold areas as determined by reduced and cutout switches on a traveling gate. In this embodiment, as the gate travels through and trips a reduced switch, a reduced timer is activated and maintains the threshold in the reduced threshold area. Subsequently, a cutout switch is tripped and a cutout timer is activated indicating that the door and the sensitivity should be reduced to cutout sensitivity. Subsequently, as the door opens, the cutout switch will be tripped and the cutout timer will be started indicating that a cutout sensitivity should be applied but, upon tripping the reduced switch, the system is cognizant of the fact that the door is returning from a closing and is in fact opening and the reduced sensitivity threshold is not activated, but in fact the sensor is then put on full sensitivity.

The system illustrated in FIG. 11 may also use a control panel similar to the control panel 1000 illustrated in FIG. 10. The control panel 1000 may be used with any type gate and has features that are activated or de-activated based upon the type of gate the system is used with.

Operation of elevator-type sliding doors or gates that use a single antenna located on one of the doors is similar to operation described above with respect to FIG. 11. However, as the two doors approach the closed position, the sensing field "reads" the presence of the approaching door and the capacitance sensed at the antenna decreases. As a result, the capacitive sensing unit operates in zones: the first zone is when the gate is fully open and there is no interaction between the sensing field and the second door, the second zone is a reduced cutout zone when the two doors converge causing the sensing field to detect the presence of the approaching zone, and a cutout zone where the two doors are almost completely closed and the capacitive sensing system is cutout. As the doors 300 move closer together a reduce switch and cutout switch, similar to the switches illustrated in FIG. 10, are provided to place the system first into a reduced mode and then cutout the system when the doors get to a predetermined distance. This predetermined distance can be any desired distance and is adjusted by using the sensitivity switches previously described.

Figure 12A:
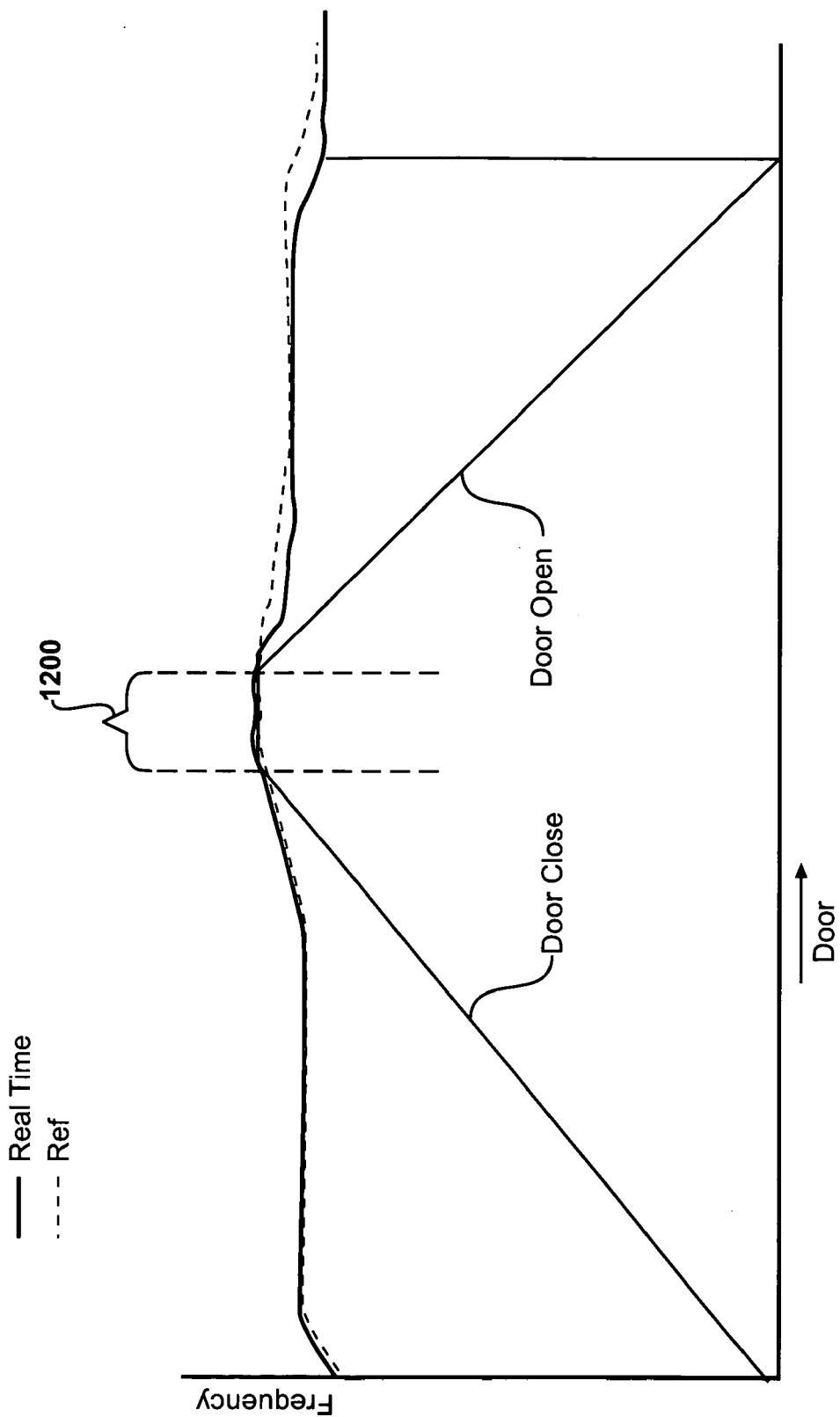
FIG. 12A illustrates the frequency vs. movement for a elevator type door with multiple antenna when no object is detected by the capacitive sensing system.
Figure 12B:
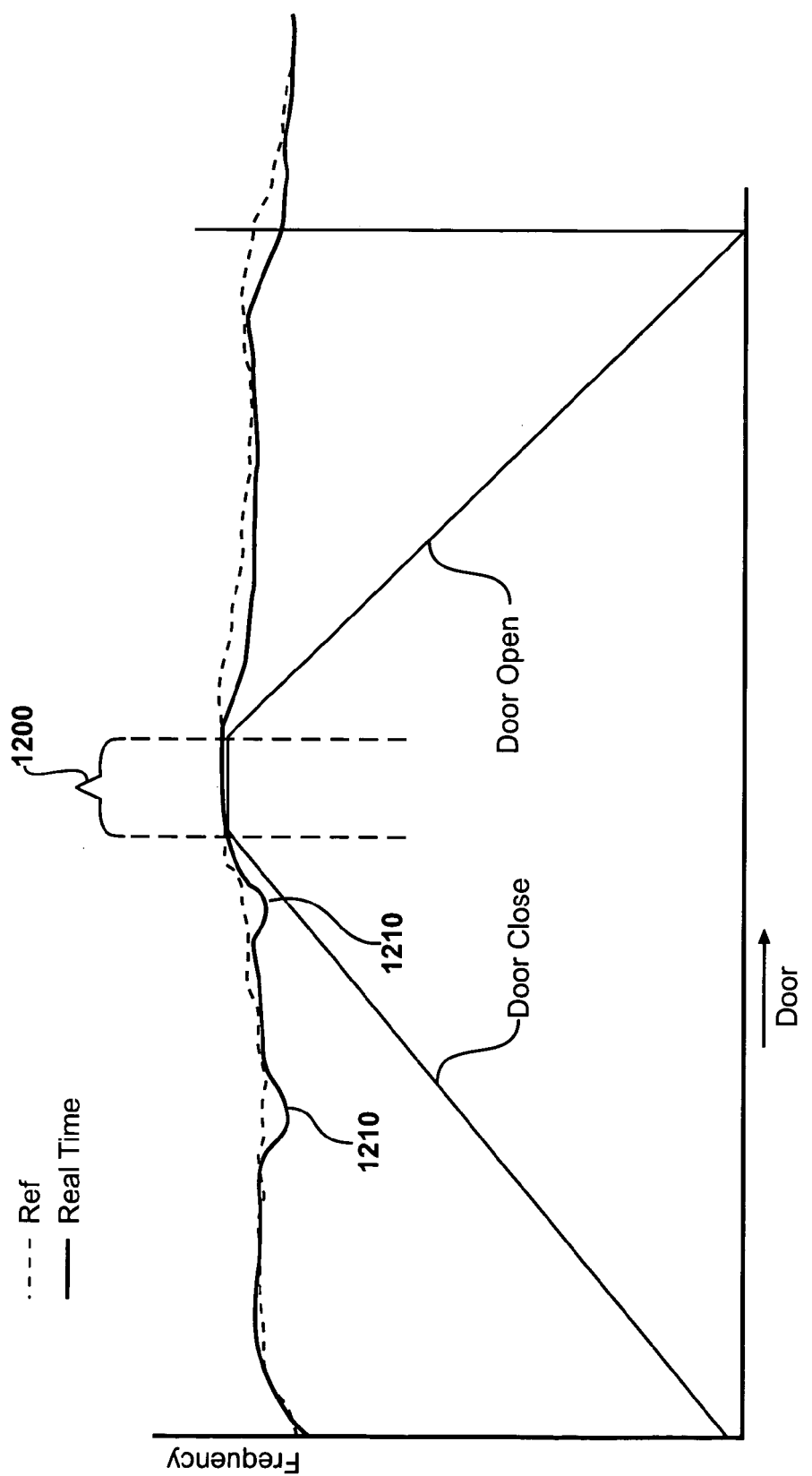
FIG. 12B illustrates the frequency vs. movement for an elevator type door with multiple antennae when an object is detected by the capacitive sensing system.

FIG. 12A illustrates the frequency vs. movement for an elevator-type gate or door using multiple antennae and a single capacitive sensing unit, when no object is detected by the capacitive sensing system. FIG. 12B illustrates the frequency vs. movement for an elevator-type gate or door using multiple antennae and a single capacitive sensing unit, when an object is detected by the capacitive sensing system. Detection of an object is indicated at spots 1210 where the frequency of the capacitive sensing system varies from the reference frequency.

As can be seen in FIG. 12A and FIG. 12B, an elevator-type door system using two antennae and single capacitive sensing unit, for example the gate illustrated in FIG. 3A and FIG. 3B, the capacitive sensing unit 330 has a relatively flat response for frequency vs. door location until the two doors 300 are almost closed. As the two doors 300 approach one another, the two sensing fields 320 interact causing the strength of the sensed field to increase and gradually increase the frequency of the capacitive sensing unit until the field reaches a cutout zone 1200 and the capacitive sensing unit is cutout. The sensor is set up to update the reference frequency at a much faster rate when the real-time frequency is increasing than when it is decreasing because the system should not send an alarm signal when the antenna pulls away from an object, causing an increase in the frequency, while the system should enable the alarm signal as it approaches an object. When the doors 300 begin to open, the capacitive sensing unit 330 remains in the cutout zone until a switch (not shown) is activated placing the capacitive sensing unit in the normal operation mode. When an object approaches either door 300, the frequency dips 1210 and the change in frequency activates an alarm, as described above, and the doors will stop movement and reverse direction to a fully open position.

Figure 13A:
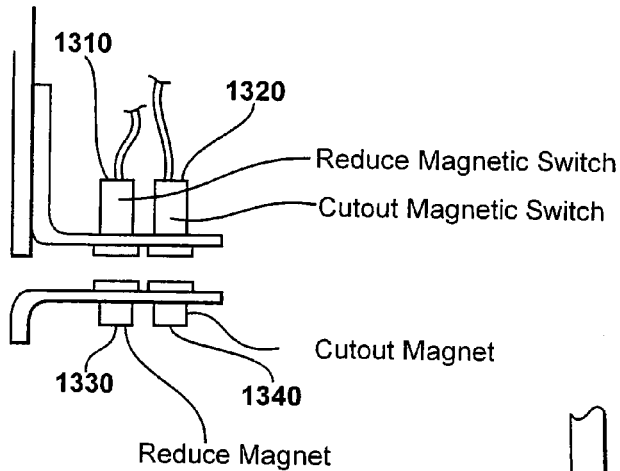
FIGS. 13A–13C illustrate a garage door system having reduce and cutout switches for the capacitive sensing unit, and operation thereof.
Figure 13B:
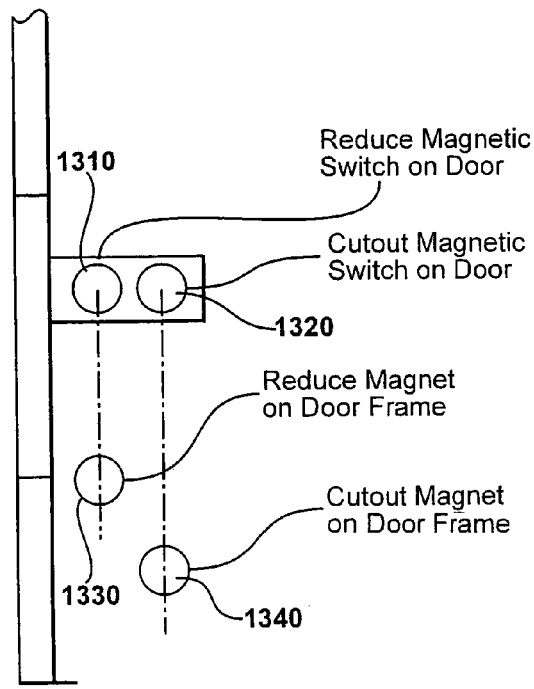

FIGS. 13A and 13B illustrate a garage door, or similar type gate, having mounted thereon a reduce switch 1310, a cutout switch 1320, with the door frame having mounted thereon a reduce magnet 1330 and a cutout magnet 1340. As described above when the garage door nears the ground or pavement, the capacitance sensed by the capacitive sensing unit changes. The garage door operates in a manner similar to the gate described above in that movement of the garage door towards the closed position causes the reduce switch to activate, placing the capacitive sensing system into the reduce mode, and then the cutout switch is activated, causing the system to be capacitive sensing system to cutout. Both the reduce switch 1330 and the cutout switch 1320 may be activated by the same magnet with the switch closest to the magnet being activated first and deactivated last. This phenomenon enables the system to have a mode that locks out the second switch closure if it occurs while the first or primary closure is present.

As a door begins traveling from the open position to the closed position, the reduce switch 1310 and the cutout switch 1320 both pass the reduce magnet 1330 and the reduce magnet 1330 activates the reduce switch 1310 causing the system to enter the reduce mode and ignore the cutout switch 1320. As the door continues traveling towards the closed position, the reduce switch 1310 and the cutout switch 1320 both pass the cutout magnet 1340 and the cutout magnet 1340 activates the cutout switch 1320 causing the system to enter the cutout mode.

Figure 13C:
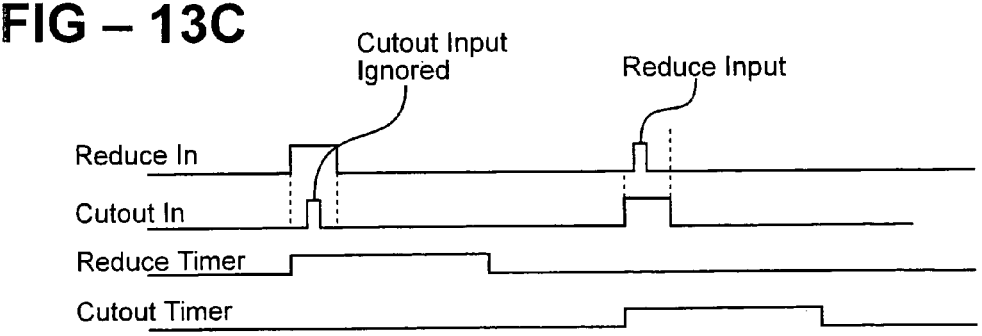

Hence, as shown in FIG. 13C, if the reduce input starts before cutout and ends after cutout, the cut-out will be locked out. Likewise, if the cutout input starts before reduce and ends after cutout it will lock out the reduce input.

One advantage of this system is that the reduce switch 1310 and the cutout switch 1320 can be easily mounted side by side on the garage door with the sensor and the position of the magnets 1330, 1340, which can be mounted vertically next to the door, determine the reduce and cutout points. This layout eliminates the need to transmit these signals in through the cable that attaches the sensor to the garage door operator.

Another advantage of the present system is that garage door operator can be programmed to accept signals while the garage door is moving from the closed position to the open position. Conventional garage door operators are programmed to detect an object blocking the path of the door only while the door is closing. However, if an object or person is caught on the garage door, the object or person may be carried upward with the door causing damage to the object or bodily harm to the person. The present system can add a reduce magnet 1330 and a cutout magnet 1340 along the upward path of an opening garage door. In this system, the door would enter the reduce mode and cutout mode as previously described. However, if an object is detected by the sensor for a predetermined period of time, for example more the 5–10 seconds, the system would activate the alarm state and the garage door operator would send a control signal to stop movement of the garage door. The garage door operator would require the ability to stop when it receives an alarm signal while in the process of opening. The garage door would stop traveling upwards, preventing an object or person from carried higher while the garage door would not move towards the closed position, preventing the object or person from being injured by a closing door. Once the object or person moves away from the garage door, the system would reset and the garage door would continue moving towards the open position.

Figure 14:
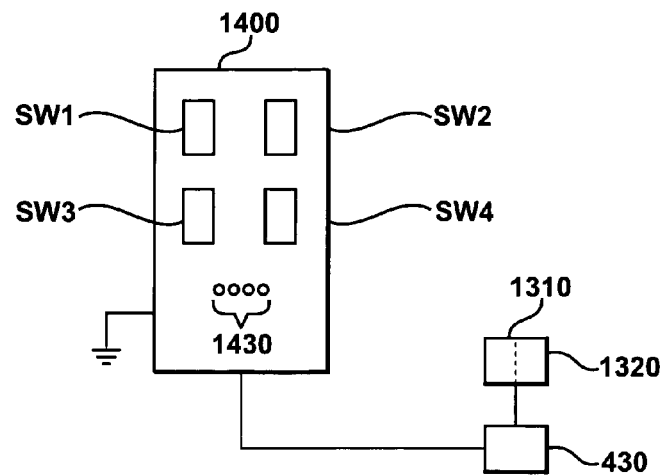
FIG. 14 illustrates a control panel for a garage door system.

FIG. 14 illustrate a control panel 1400 for a garage door system (for example, the door of FIG. 4) having a capacitive sensing unit 430, a reduce switch 1310, and a cutoff switch 1320. In a preferred embodiment, control panel 1400 is located in a convenient location such as next to the wall mounted garage door opener control. In an alternative embodiment, the control panel 1400 is located in close proximity, or mounted on the garage door, and the capacitive sensing unit 430 is integrated therein. The control panel includes at least multiple switches SW1–SW4, an indicator 1430, a connection to ground and a connection to a power source. Four switches are shown for illustrative purposes only, any desired number of switches may be provided. Adjustment switch SW1 is used to set up the operating frequency of the sensor and change the parameters of the antenna frequency. Reset pushbutton switch SW2 is used to reset the sensor and allow for the system to disable the alarm for a period of time, this is useful for initial set-up of the system. Sensitivity switches SW3, SW4 are used to adjust the sensitivity of the sensor in normal sensitivity, which is the sensitivity for the door when the door is at the top or fully open, and reduced sensitivity setting, which is the sensitivity as the arc of the gate moves towards the ground or pavement. The sensitivity switches SW3, SW4 may be rotary dials that have multiple settings, for example 10 different settings. The sensitivity switches SW3, SW4 may include a course adjustment, for example increments of 10, and a fine adjustment, for example increments of 1. The indicators 1430 that may include Light Emitting Diodes (LEDs) or a Liquid Crystal Display (LCD), the indicators are useful for providing information such as status of the system, a system power indicator, the signal strength of the sensor, and any other desired information.

The system illustrated in FIG. 14 benefits from an initial installation and proper setup. To initialize the installed system move or operate the gate to a fully open position and apply power the capacitive sensing system and control panel 1400. Set-up begins automatically as the capacitive sensing system "learns" its environment or alternatively a switch in the control panel 1400 may be used to start the "learning" mode. An indicator 1430 flashes, displays, or otherwise indicates the operating frequency of the antenna and indicates that the system has been successfully installed and initialized and ready for operation. Indication of the operating frequency of the antenna is useful in systems where multiple doors are in close proximity to each other, allowing the operator to set the operating frequency for each door to a unique range.

If an alternative indicator, such as high pitched noise of flashing red lights (or LEDs), is present it is indicated that the system is in a "Failsafe" mode and the system is not properly installed or setup. The problems may include an antenna that is not properly installed, the antenna is not electrically connected to the sensor or the initial setup has not been properly completed.

If the system is not in the "Failsafe" mode, the indicators 1430 indicate that the system is properly operating and whether or not an object is detected. For example, if no object is located in close proximity to the door two green LEDs light, while three lit green LEDs indicate that an object is located near the door.

Once the initialization is complete, the sensitivity can be adjusted using the normal sensitivity switch SW3 and the reduced sensitivity switch SW4. The normal sensitivity is adjusted by causing the gate to close while placing an object, such as a hand or conductive object, in the path of the gate arm 215. The capacitive sensing unit 430 detects the object near the door and triggers the alarm mode causing the gate to reverse before reaching the hand or conductive object. If the gate reaches the hand or conductive object, the sensitivity switch SW3 is adjusted to increase the sensitivity of the capacitive sensing unit 430. If the gate reverses direction before coming in close proximity to the object, for example 8–12 inches, the sensitivity may be too high causing the door to reverse to easily and the normal sensitivity adjustment switch SW3 is adjusted to decrease the sensitivity. This procedure is repeated as necessary until the system is set to the desired sensitivity. The door's ability to stop rapidly and reverse directions can be taken into account while performing the sensitivity check. A door that is slow to stop and reverse directions may make the capacitive sensing unit 230 appear to be less sensitive than the actual setting.

Figure 15:
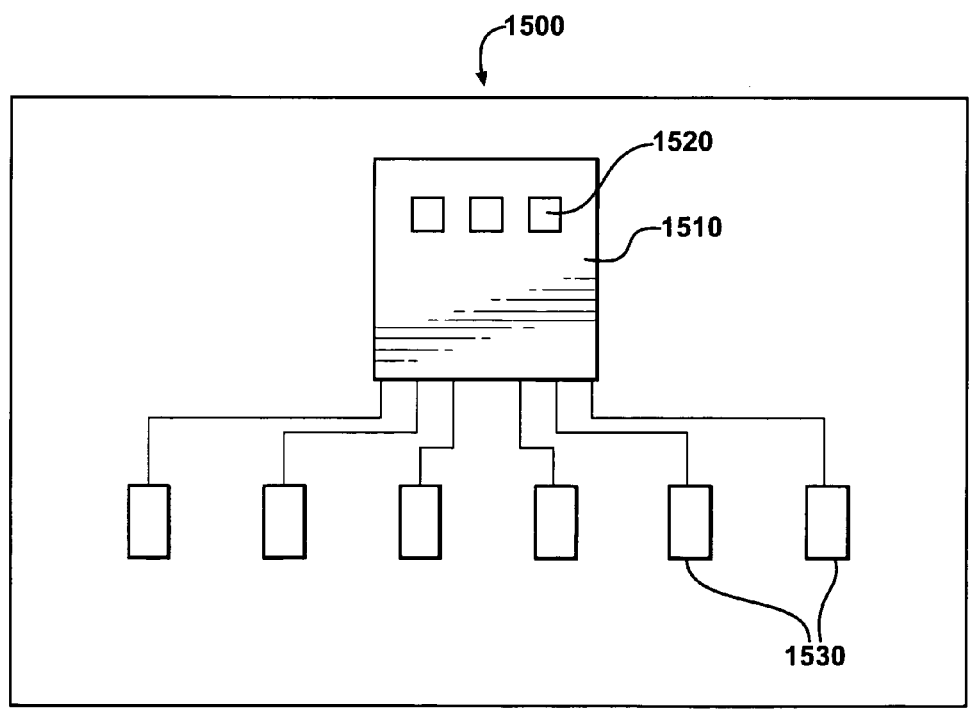
FIG. 15 illustrates a control panel for security system.

FIG. 15 illustrates a control panel 1510 for a security system 1500, such as the system illustrated in FIG. 6E, that includes at least one capacitive sensing unit and may include as many needed. The control panel may be a touch sensitive display, a display connected to one or more input devices (such as input device 1520), or a panel similar to those illustrated in FIG. 10 and FIG. 14. The control panel is used to indicate a zone, such as a room, or a specific area that has an alarm activated by the capacitive sensing unit 1530. The control panel also enables an operator to perform the initial set-up of the security system. The initial set-up includes a system test, to determine that all of the capacitive sensing units are properly connected and that two capacitive sensing units located in close proximity will not interfere, a sensitivity test to prevent an overly sensitive alarm, and an activation/deactivation schedule. Many commercial buildings, such as a bank, museum or office building, have hours in which areas open to the public and hours in which areas are closed to the public. It is desirable to have the system deactivated when a building is open to the public to prevent numerous false alarms. Initial set-up also allows for the setting of a threshold time minimum, or the minimum time over which an object is detected before the alarm is activated. This feature is very useful for buildings that have a roaming security guard that may walk past specific sensors for very short periods of time. A security "route" can be set which enables a guard to follow a fixed route at a fixed time, enabling the alarm to be activated if a capacitive sensing unit detects the presence of a moving object at the wrong time or even if the capacitive sensing unit does not detect the presence of a moving object when an object is suspected.

The control panel has one or more outputs for transmitting control commands to various systems of the building. For example, triggering an alarm causes an audible alarm to be activated, a signal to be sent to the local police indicating which sensing unit detected an intruder and a trigger locking all windows and doors and closing all security gates.

The sensing units may also be set to activate and alarm when the presence of the protected object (for example, 600*a* or 600 in FIG. 6) is no longer detected. Absence of the object will reduce the capacitance of the sensing field 640 shown in FIG. 6D, indicating that the protected object is no longer present.

The sensing units in the building can be "smart units" that are programmed to "learn" or adjust based upon the state of closely located sensing units. In one example, a room has three sensing units; the first is located in close proximity to a door, the second in close proximity to a window, and third in close proximity to a safe. Upon detecting that the object has passed through the doorway, the sensitivity of the sensing unit located in close proximity to the safe is adjusted to a higher level providing further protection from theft. This also enables a home user to have the system activated when he or she is not home but his or her children are. This prevents the child or a baby sitter from opening the safe while enabling the occupants to move throughout the house. In another embodiment, a home owner having the security system may have a "pet" setting in which the sensitivity of the system is reduced to account for a cat or small dog. In this mode, small animals nearing capacitive sensing units will generate a change in the sensing field that is below the "pet" setting threshold and will not activate the alarm while an intruder larger than the animal will generate a change the sensing field that is above the threshold, activating the alarm.

Figure 16:
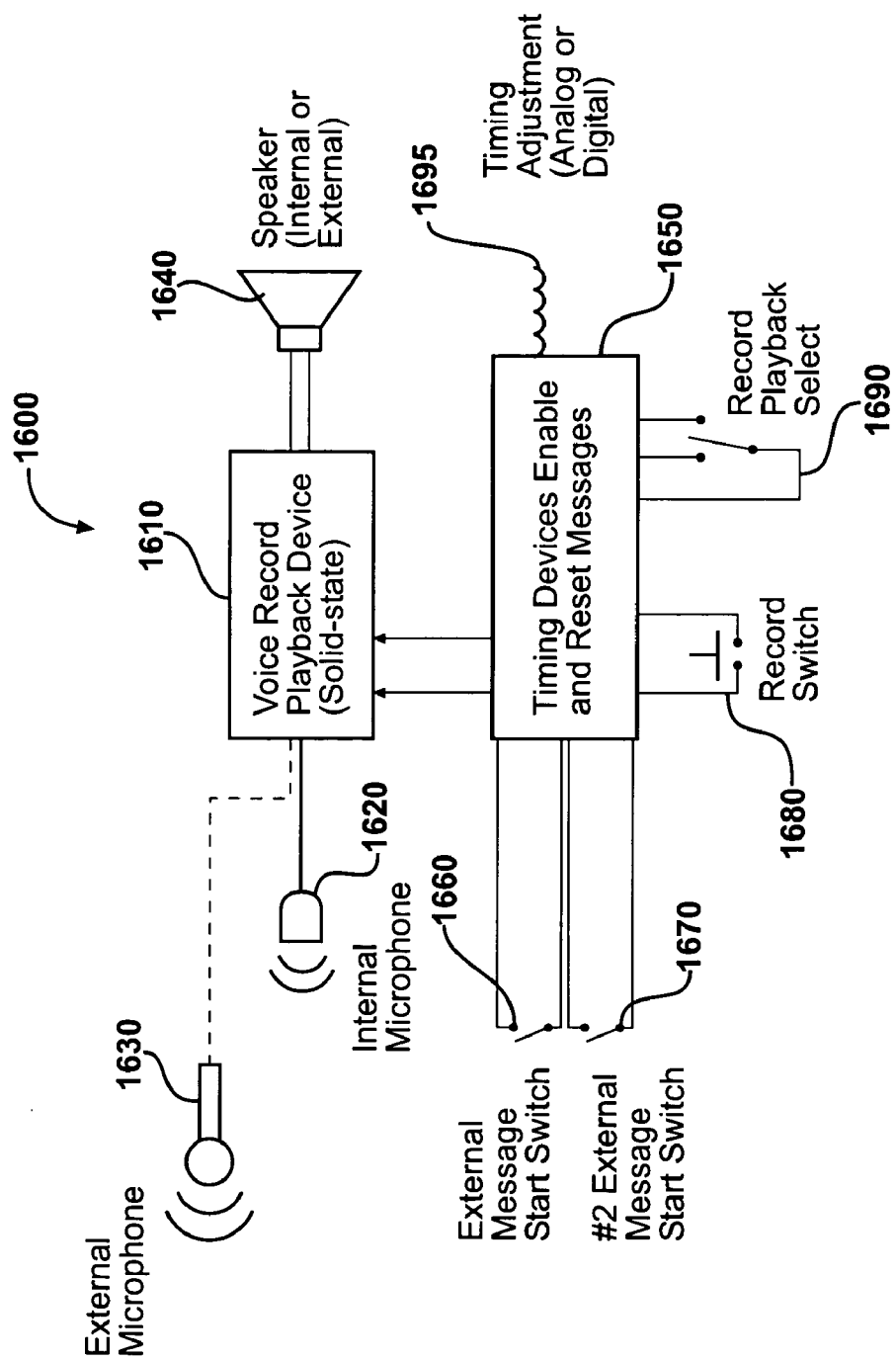
FIG. 16 illustrates a security system having a voice warning system.

FIG. 16 illustrates an embodiment of a security system including a voice warning system 1600 that may use one or more audible messages to warn an intruder that he or she is a secure area. The voice warning system 1600 has a voice record and playback device 1610 that records audio messages received from either an internal microphone 1620, an external microphone 1630 or as a digital or analog electric signal and transmits selected audio messages to a speaker 1640. In a preferred embodiment video record and playback device is a solid state unit that digitally saves the audio commands. The speaker 1640 may be located as an internal speaker with the voice record and playback device or may be one or more externally located speaker. A controller 1650 is provided to control the video record and playback and device to playback selected audio commands upon receiving alarm signals. The controller 1650 is connected to an external message start switch 1660, a second external message start switch 1670, a record switch 1680, a record playback switch 1690, and timing adjustment switch 1695 that may be an analog or digital adjustment switch. The controller 1650 acts as a timing device to enable and reset messages.

An operator initializes the voice warning system 1600 by using the record switch 1680 to indicate to the controller 1650 that the voice record and playback device should be set to a record mode. After setting the record mode, the operator records one or more audio warnings by using the internal microphone 1620, the external microphone 1630 or by transmitting previously recorded and digitally stored audio signals to the voice record and playback device 1610. The operator then may use the record playback select switch 1690 to control playback of the stored audio messages to determine if the messages have been recorded properly and to determine if the messages contain the proper content. The operator then may place the voice warning system into a test or initialization mode. In the test (or initialization mode) the voice record and playback device 1610 will transmit the stored audio messages to one or more speakers 1640 and playback the stored messages in a previously set order. The operator can note the timing of the playback of the one or more audio messages and use the timing adjustment switch 1695 to set the playback interval to a desired setting. After the operator determines that the one or messages are properly recorded and stored in the voice record and playback device 1610 and that the timing of the playback is properly set, the operator then places the system into a normal operation mode.

The voice warning system 1600 in normal operation mode is used to warn one or more intruders that he or she is a secure area or a restricted area. For example, an area of a public building has restricted access and the door allowing entry to the area has a capacitive sensing system installed thereon. Upon detecting that a person is approaching the door (or near the door) the capacitive sensing system generates an alarm signal that is transmitted to the voice warning system 1600. The external message start switch 1660 is activated and the controller 1650 transmits a command to the voice record and playback device 1610 to playback a first audio message warning that "Stop, you are entering a restricted area, please go back." If the person does not leave the vicinity of the door or continues to approach the door, the capacitive sensing system enters a second alarm states and transmits the second alarm condition to the voice warning system. The second external message switch 1670 is activated and the controller 1650 transmits a command to the voice record and playback device 1610 to playback a second audio message warning that, "Stop, you may not proceed. Please exit the area or the police will be notified of your intrusion." If the person does not leave the vicinity of the door or continues to approach the door, the voice warning system may playback a third message in addition to activating the alarm system. If the person (or persons) leaves the area for a predetermined period of time, for example 30 seconds, the voice recording system 1600 automatically resets back to the normal operating mode and will repeat the first audio message upon the detection of another object by the capacitive sensing system.

Any number of desired audio messages may be recorded in the voice record and playback device 1610 and activation of the alarm can include traditional response. For example, activation may include activating an audio siren, activating a flashing or strobe light, placing an electronic call to a police station or security expert, and closing security gates or fences.

In another embodiment of the voice activation system the second external message switch 1670 is not included. In this embodiment, the system plays sequential messages using the single input by sequentially changing the selected message until an elapsed time between messages exceeds a threshold time causing the system to reset.

In another embodiment of the voice activation system, the voice record and playback device 1610 is not connected to a speaker 1640, as shown in FIG. 16, but is instead electronically connected to an external amplifier and speaker system. The external amplifier receives signals transmitted from the voice record and playback device 1610 and transmits signals to drive one or more selected speaker, in one or more selected location. This configuration enables a single voice warning system 1600 to control speakers in various locations throughout a building or area.

The many features and advantages of the invention are apparent from the detailed specification. Thus, the appended claims are intended to cover all such features and advantages of the invention that fall within the true spirit and scope of the invention. Furthermore, since numerous modifications and variations will readily occur to those skilled in the art, it is not desired to limit the invention to the exact construction and operation illustrated and described. Accordingly, all appropriate modifications and equivalents may be included within the scope of the invention.

Hence, in a capacitive sensing system according to the present invention, electronic circuitry is used to monitor a capacitance proximate to an antenna, and to relate the sensed capacitance to a representative quantity such as the sensing field frequency. The representative quantity is compared to a stored value, and the comparison is used to determine the presence or absence of an object. Embodiments of the present invention may also detect motion of an object (for example, from the time dependence of a sensing frequency), the level of a liquid, a change in temperature, or a change in pressure. A sensing signal is generated which can be used to drive a visual display, activate an alarm (such as a visual and/or audible alarm, or an alarm sent to a remote location such as a security office or police station), or can be transmitted for storage and retrieval in an electronic device. The alarm may be audible, visual, vibrational, an electrical signal transmitted to a remote security office (such as a police station), or some combination thereof.

Further description of capacitive sensors, and associated circuits and applications, which may also be used in embodiments of the present invention, can be found in the following patent and patent applications, herein incorporated by reference in their entirety: U.S. Pat. No. 6,819,242 to Michael entitled "Apparatus for use with Capacitive Presence Detection Systems"; U.S. Pat. Pub. No. 2004/0061610 (application Ser. No. 10/398,048) to Michael et al. entitled "Apparatus and Circuit for use with Capacitive Presence Detection Systems"; Int. Pat. Pub. No. WO03/100941A1 (App. No. PCT/US03/16205) entitled "Recharging System for a Remote Capacitive Sensing Apparatus"; Pub. Intl. App. WO04/019062 (App. No. PCT/US03/26241) entitled "Security Apparatus for the Detection of Approaching Objects" to Michael et al.; PCT Patent Application WO 04/023526 (PCT/US03/27795) entitled "Apparatus and Method for Processing Capacitor Sensor Signals Using Digital Frequency Shift Measurement Techniques With Floating Reference"; and Intl. Pub. No. WO 04/053524 to Fergusson entitled "Method of Steering Capacitor Fields for use in Capacitive Sensing Security Systems"

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

Patents, patent applications, or publications mentioned in this specification are incorporated herein by reference to the same extent as if each individual document was specifically and individually indicated to be incorporated by reference. In particular, U.S. Prov. Pat. App. Ser. No. 60/608,298, filed Sep. 9, 2004, is incorporated herein in its entirety.

Having described my invention, I claim:

1. An apparatus for sensing an object, the apparatus comprising:
 a field generating circuit, providing a sensing field signal having a sensing field frequency;
 an antenna, in electrical communication with the field generating circuit, the sensing field frequency being modified by a capacitive coupling between the antenna and the object when the object is proximate to the antenna;
 a frequency comparison circuit, providing a frequency comparison of the sensing field frequency with a reference value to determine if the sensing field frequency is greater or less than the reference value, and further operable to provide a difference value that corresponds to a difference between the sensing field frequency and the reference value
 a reference value circuit, providing the reference value to the frequency comparison circuit for the frequency comparison, and operational to increment the reference value if the sensing field frequency is greater than the reference value, and to decrement the reference value if the sensing field frequency is less than the reference value;
 a threshold compare circuit, receiving the difference value and comparing the difference value with a threshold value, the threshold compare circuit providing a detect signal if the difference value is greater than the threshold value; and
 a condition sensor providing a condition signal, the threshold value being adjustable according to the condition signal.

2. The apparatus of claim 1, wherein the antenna is associated with a moveable member, the moveable member having a position,
 the condition sensor comprises a position sensor, the threshold value being adjustable according to the position of the moveable member,
 the detect signal representing the sensing of the object proximate to the moveable member.

3. The apparatus of claim 2, wherein the antenna comprises a portion of the moveable member.

4. The apparatus of claim 2, wherein the position sensor comprises one or more switches activated by movement of the moveable member.

5. The apparatus of claim 2, wherein the position sensor comprises a switch,
 the switch being activated by movement of the moveable member into a range of positions,
 activation of the switch changing the threshold value from a first threshold value to second threshold value.

6. The apparatus of claim 2, wherein the threshold value is a stored function of the position.

7. The apparatus of claim 2, wherein the threshold value has a first threshold value over a first range of positions, and a second threshold value over a second range of the positions,
 the first threshold value being greater than the second threshold value.

8. The apparatus of claim 7, wherein the moveable member has a closed position,
 the first range of positions corresponding to positions proximate to the closed position.

9. The apparatus of claim 7, wherein the sensing of the object is suppressed when the position is in a cutout range, the cutout range lying within the first range of positions and corresponding to positions closest to the closed position.

10. The apparatus of claim 9, wherein the apparatus provides an alarm when the object is sensed,
 the alarm being suppressed when the position is in the cutout range.

11. The apparatus of claim 2, wherein the movable member is selected from a group of moveable members comprising gates, doors, barriers, and windows.

12. The apparatus of claim 2, wherein the position is a linear position or an angular position of the moveable member relative to a frame supporting the movable member.

13. The apparatus of claim 2, wherein the position sensor comprises a cutout switch,
 wherein activation of the cutout switch suppresses the detect signal when the position is in a cutout range proximate to a closed position of the movable member.

14. The apparatus of claim 1, wherein the field generating circuit comprises a tank circuit.

15. The apparatus of claim 1, wherein the reference value providing circuit comprises a reference counter, the reference value being stored in the reference counter.

16. The apparatus of claim 1, wherein the frequency comparison circuit comprises a counter,
 the counter being loaded with the reference value from the reference value circuit, the counter being decremented during a comparison time in response to the sensing field signal, a final value in the counter representing the difference value.

17. The apparatus of claim 1, wherein the apparatus provides a first alarm in response to the detect signal,
 the apparatus further providing a second alarm after prolonged or repeated provision of the first alarm.

18. The apparatus of claim 1, wherein the detect signal is provided if the object is not proximate to the antenna, the apparatus providing a security alarm in response to the detect signal.

19. The apparatus of claim 18, wherein the apparatus further provides a second security alarm after prolonged or repeated provision of the security alarm.

20. The apparatus of claim 1, wherein the condition sensor comprises a clock, the condition signal being a time signal.

21. The apparatus of claim 20, wherein the threshold value is lowered at times outside normal business hours.

22. The apparatus of claim 1, wherein the condition sensor comprises an operator input.

23. The apparatus of claim 22, wherein the operator input is a maintenance input, the maintenance input putting the apparatus into a maintenance mode in which the detect signal is not provided.

24. The apparatus of claim 1, wherein the condition sensor comprises a position sensor, the position sensor including one or more switches providing switch signals at intervals as a moveable member changes position,
 the position of the moveable member being continuously determined using the switch signals and a time from receipt of a received switch signal,
 the threshold value being adjusted according to the position of the movable member.

25. The apparatus of claim 1, wherein the threshold value is determined as a function of the condition signal during an initial setup process.

26. The apparatus of claim 1, wherein the apparatus is further operational to detect spoofing by an external electromagnetic field using an adjustment of the field generating circuit.

27. The apparatus of claim 26, wherein the adjustment is an adjustment of the sensing field frequency, spoofing being detected by a difference value substantially less than the adjustment of the sensing field frequency.

28. The apparatus of claim 26, wherein the adjustment is a disabling of the field generating circuit, spoofing being detected by continued reception of the sensing field frequency by the frequency comparison circuit.

29. An apparatus for providing an alarm if an object is removed from a location, the apparatus comprising:
a field generating circuit, providing a sensing field signal having a sensing field frequency;
an antenna situated proximate to the location, the antenna being in electrical communication with the field generating circuit, the sensing field frequency being modified by a capacitive coupling between the antenna and the object when the object is at the location;
a frequency comparison circuit, providing a frequency comparison of the sensing field frequency with a reference value to determine if the sensing field frequency is greater or less than the reference value, and further operable to provide a difference value that corresponds to a difference between the sensing field frequency and the reference value;
a reference value circuit, providing the reference value to the frequency comparison circuit for the frequency comparison, and operational to increment the reference value if the sensing field frequency is greater than the reference value, and to decrement the reference value if the sensing field frequency is less than the reference value; and
a threshold compare circuit, receiving the difference value and comparing the difference value with a threshold value, the threshold compare circuit providing a detect signal if the difference value is greater than the threshold value;
the apparatus providing the alarm when the detect signal is provided.

30. The apparatus of claim 29, wherein the antenna is embedded in or proximate to an object support, the object support being used to support the object.

31. The apparatus of claim 29, wherein the object support is a wall.

32. The apparatus of claim 29, the apparatus further providing a second alarm after the alarm is provided for a predetermined time interval.

33. A method of sensing an object, the method comprising:
providing a sensing field signal having a sensing field frequency that is modified by capacitive coupling of the object to an antenna;
comparing the sensing field frequency with a reference value to provide a difference value;
incrementing the reference value by a reference increment if the sensing field frequency is greater than the reference value, decrementing the reference value by a reference decrement if the sensing field frequency is less than the reference value, the reference increment and reference decrement both being substantially independent of the difference value;
comparing the difference value with a threshold value;
providing a detect signal if the difference value is greater than the threshold value, provision of the detect signal representing sensing the object.

34. The method of claim 33, wherein the antenna is associated with a moveable member, the moveable member having a position,
the method further comprising sensing the position of the moveable member, and
the threshold value being correlated with the position of the moveable member.

35. The method of claim 33, further comprising provision of an alarm if the object is sensed proximate to the moving member,
the moveable member having a closed position, and the alarm being suppressed if the position of the moveable member is within a cutout range of the closed position.

36. The method of claim 33, further comprising storing threshold values as a function of position during a test movement of the moveable member so as to provide threshold values correlated with the position of the moveable member.

37. The method of claim 33, wherein the threshold value has a first threshold value over a first range of positions, and a second threshold value over a second range of positions,
the first threshold value being greater than the second threshold value, and the first range of positions being closer to a closed position of the moveable member.

* * * * *

UNITED STATES PATENT AND TRADEMARK OFFICE
CERTIFICATE OF CORRECTION

PATENT NO. : 7,187,282 B2 Page 1 of 1
APPLICATION NO. : 11/222339
DATED : March 6, 2007
INVENTOR(S) : Robert T. Fergusson It is certified that error appears in the above-identified patent and that said Letters Patent is hereby corrected as shown below:

Column 1, line 50, before "person" insert --a--
Column 1, line 52, after "individual" insert --.--
Column 1, line 52, before "Many" begin new paragraph
Column 3, line 67, after "used" insert --on--
Column 3, line 67, after "gate" insert --or--
Column 4, line 7, replace "sensor" with --sensors--
Column 5, line 18, after "when" insert --an--
Column 5, line 25, replace "a" with --an--
Column 5, line 26, replace "antenna" with --antennae--
Column 8, line 28, replace "runs" with --run--
Column 10, line 36, after "can" insert --be--
Column 10, line 37, delete the second occurrence of "the"
Column 12, line 5, replace the second occurrence of "the" with --be--
Column 14, line 14, replace "anther" with --another--
Column 15, line 48, after "acts" insert --as--
Column 19, line 38, replace "to" with --too--
Column 22, line 12, after "from" insert --being--

Signed and Sealed this

Twelfth Day of June, 2007

JON W. DUDAS
*Director of the United States Patent and Trademark Office*